(12) United States Patent
Lozier

(10) Patent No.: US 11,794,815 B2
(45) Date of Patent: Oct. 24, 2023

(54) REINFORCED INTERLOCKING FRAME SYSTEM AND COMPONENTS THEREFOR

(71) Applicant: Thor Tech, Inc., Elkhart, IN (US)

(72) Inventor: Todd B. Lozier, Elkhart, IN (US)

(73) Assignee: Thor Tech, Inc., Elkhart, IN (US)

( * ) Notice: Subject to any disclaimer, the term of this patent is extended or adjusted under 35 U.S.C. 154(b) by 750 days.

(21) Appl. No.: 16/779,150

(22) Filed: Jan. 31, 2020

(65) Prior Publication Data
US 2021/0188363 A1  Jun. 24, 2021

Related U.S. Application Data

(60) Provisional application No. 62/954,976, filed on Dec. 30, 2019, provisional application No. 62/953,061, (Continued)

(51) Int. Cl.
*B62D 21/20* (2006.01)
*B60P 3/32* (2006.01)
(Continued)

(52) U.S. Cl.
CPC .......... *B62D 21/20* (2013.01); *B29C 65/4855* (2013.01); *B29C 66/522* (2013.01);
(Continued)

(58) Field of Classification Search
None
See application file for complete search history.

(56) References Cited

U.S. PATENT DOCUMENTS

| | | | |
|---|---|---|---|
| 4,269,890 A * | 5/1981 | Breitling | B29C 44/184 264/45.2 |
| 7,169,344 B2 * | 1/2007 | Coon | B62D 29/002 264/263 |

(Continued)

FOREIGN PATENT DOCUMENTS

| | | |
|---|---|---|
| JP | 52-141853 U | 9/1980 |
| JP | 08-061330 A | 3/1996 |

(Continued)

OTHER PUBLICATIONS

International Search Report and Written Opinion for PCT/US2020/064834, dated Apr. 29, 2021, 15 pages.

*Primary Examiner* — Joshua K Ihezie
(74) *Attorney, Agent, or Firm* — Gardner, Linn, Burkhart & Ondersma LLP

(57) ABSTRACT

A structural assembly for a recreational vehicle includes a first structural frame member having a wall and a hollow space at least partially defined by the wall and a second structural frame member having a section thereof extended into the hollow space of the first structural frame member forming an internal interface with the wall of the first structural frame member. The assembly further includes a foam material located in the hollow space that fills a portion of the hollow space to thereby form a bearing member adjacent the section to restrict motion of the section relative to the wall and thereby to form an internal connection between the second structural frame member and the first structural frame member at the internal interface to secure the second structural frame member to the first structural frame member to form a recreational vehicle component.

23 Claims, 42 Drawing Sheets

Related U.S. Application Data filed on Dec. 23, 2019, provisional application No. 62/951,979, filed on Dec. 20, 2019.

(51) Int. Cl.
  *B29C 65/48* (2006.01)
  *B29C 65/00* (2006.01)
  *B62D 27/02* (2006.01)
  *B62D 29/00* (2006.01)

(52) U.S. Cl.
  CPC .............. *B60P 3/32* (2013.01); *B62D 27/023* (2013.01); *B62D 29/002* (2013.01)

(56) References Cited

U.S. PATENT DOCUMENTS

| | | | |
|---|---|---|---|
| 7,341,317 B2* | 3/2008 | Platner | B29C 44/184 301/124.1 |
| 9,561,606 B2* | 2/2017 | O'Leary | E04B 1/26 |
| 2004/0232688 A1* | 11/2004 | Platner | B62D 29/002 280/797 |
| 2008/0296164 A1* | 12/2008 | Dajek | B62D 29/004 296/187.02 |
| 2009/0277125 A1 | 11/2009 | Smith et al. | |
| 2022/0332024 A1* | 10/2022 | Focke | B29C 44/34 |

FOREIGN PATENT DOCUMENTS

| | | |
|---|---|---|
| JP | 11-264199 A | 9/1999 |
| JP | 2000-054529 A | 2/2000 |
| KR | 10-0471808 B1 | 3/2005 |
| KR | 100471808 | 3/2005 |
| KR | 20-2017-0003349 U | 9/2017 |

\* cited by examiner

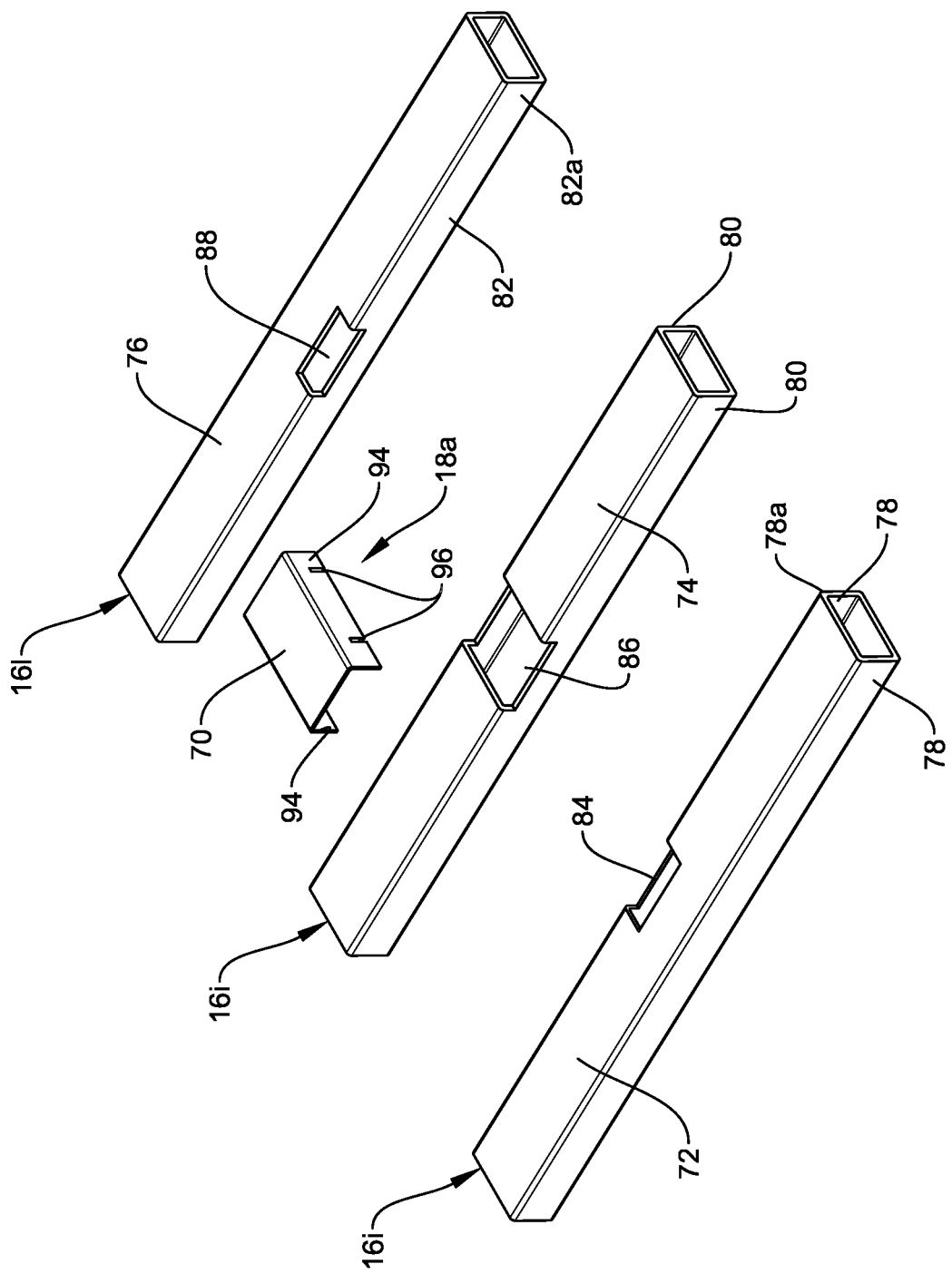

REINFORCED INTERLOCKING FRAME SYSTEM AND COMPONENTS THEREFOR

TECHNICAL FIELD AND BACKGROUND

Recreational vehicle (RVs) components, such as walls (including interior walls and exterior sidewalls), floors, and ceilings, are often formed from a laminated panel.

Traditional laminated RV panels are comprised of sheet material layers that are mounted to an aluminum tube frame with foam inserts placed in the frame openings to provide structure, sound dampening, and thermal protection. A typical sandwich panel (from its exterior finish to its interior finish) likely consists of fiber reinforced plastic sheet, a Luan wood sheet or other engineered sheet products, the aluminum frame and foam core, and then a Luan wood sheet with decor paper covering the interior side. This laminated panel configuration is used on RV side wall, floors, rear walls, slide-out walls, slide-out floors, and other smaller structural components used in the RV.

Central to each laminated structure is the aluminum tube frame. The aluminum frame is typically comprised of hollow thin aluminum tubes that are welded together. These frames typically provide enough structure to create the core of the panel, such as the side wall, but ultimately the integrity of the panel is defined by the laminated sandwich that combines the shear strength of its exterior sheets with the core (the frame and the foam inserts) to form a mechanically sound panel, such as a floor or wall. However, given the nature of RVs in that they are pulled over varied terrain and subject to repeated vibration and shock loading from travel and transportation, the panels tend to take the brunt of the loading and can fail under extreme conditions. Often, these failure can be initiated or at least include the failure of a weld joint.

SUMMARY

Accordingly, a structural assembly for a recreational vehicle is disclosed that includes a frame formed from a plurality of structural frame members that are interconnected at joints, with at least one or more of the joints configured with controlled flexibility, for example, with one or more degrees of freedom, to reduce stresses in the frame. Alternately, or in addition, one or more of the joints are configured to redistribute the loads from the intersection of two structural frame members to the other portions of the two structural frame members remote from their intersection. Alternately, or in addition, one or more of the joints are configured to provide an internal support, such as an internal bearing member or spring, that reinforces and/or redistributes some of the forces at the intersection of the two structural frame members across the cross-section of at least one of the structural frame members so that portions of the at least one of the structural frame member that are not located at the joint contribute to the effective cross-section of that structural frame member.

In one embodiment, a structural assembly for a recreational vehicle includes a first structural frame member and a second structural frame member with a section thereof extended into a hollow space of the first structural frame member to form an internal interface with the wall of the first structural frame member. A foam material is located in the hollow space, filling a portion of the hollow space to form an internal connection between the second structural frame member and the first structural frame member at the internal interface to secure the second structural frame member to the first structural frame member.

In one embodiment, the foam material is a rigid foam material to form a rigid restraint adjacent the section of the second structural frame member.

In another embodiment, the foam material is compressible and, optionally, forms a spring adjacent the section of the second structural frame member.

In one aspect, the first structural frame member has an injection port in communication with the hollow space for injecting the foam material into the hollow space, and optionally a plurality of injection ports for injecting the foam material into the hollow space from multiple locations.

In one embodiment, the section of the second structural frame member that engages the side wall of the first structural frame member comprises a tab. The first structural frame member has at least one notch to receive the tab into the hollow space.

For example, the tab may comprise a pair of tabs, with the notch to receive the pair of tabs into the hollow space.

In another embodiment, the notch comprises a pair of notches to receive the pair of tabs into the hollow space.

In yet another embodiment, the tab includes a recess for receiving a portion of the foam material to mechanically couple the foam material to the tab.

For example, the recess may comprise a through hole or a notch in the tab.

In yet another embodiment, the first structural frame member has an upper wall and a pair of opposed side walls depending from the upper wall. The upper wall has a notch at one of the opposed side walls. The second structural frame member has a side wall with a distal end and a slot adjacent the distal end. The section is defined between the slot and the distal end of the side wall of the second structural frame member, with the first side wall of the first structural frame member received in the slot of the second structural frame member. The foam material at least fills the hollow space adjacent the section and bears against the section of the second structural frame member to thereby restrain movement of the second structural frame member relative to the first structural frame member.

In a further aspect, the second structural frame member has an upper wall, and the side wall of the second structural frame member includes a pair of opposed sides walls depending from the upper wall of the second structural frame member. The upper wall of the second structural frame member is located adjacent the notch of the first structural frame member.

In yet a further aspect, the first structural frame member has an injection port in communication with the hollow space adjacent the section of the second structural frame member for injecting the foam material into the hollow space adjacent the section. Optionally, the first hollow structural frame member includes a plurality of injection ports for injecting the foam material into the hollow space adjacent the section.

In another embodiment, the second structural frame member is a hollow structural frame member with an upper wall and a second hollow space adjacent the first side wall of the first hollow structural frame member. The second structural frame member, such as the upper wall of the second structural frame member, has an injection port in communication at least with the second hollow space of the second structural frame member adjacent the first side wall of the first hollow structural frame member.

For example, the foam material or another foam material is located in the second hollow space of the second structural frame member.

In one embodiment, foam materials with different properties are located in each of the hollow spaces to optionally provide flexibility or rigidity where needed.

In another embodiment, the structural assembly further includes a third structural frame member having a side wall with a distal end and a slot adjacent its distal end. The side wall of the third structural frame member defines a second section between the slot and the distal end of the third structural frame member. A second side wall of the opposed side walls of the first hollow structural frame member is received in the slot of the third structural frame member wherein the second section of the third structural frame member is extended into the hollow space of the first hollow structural frame member. The foam material or another foam material is provided adjacent the second section in the hollow space of the first hollow structural frame member to thereby internally couple the third structural frame member to the first hollow structural frame member.

Optionally, the foam material forms a bearing member adjacent the section of the second structural frame member and adjacent the second section of the third structural frame member.

In yet another embodiment, the third structural frame member is a hollow structural frame member with a third hollow space adjacent a second side wall of the opposed side walls of the first hollow structural frame member. The third structural frame member, such as its upper wall, has an injection port in communication at least with the third hollow space of the third structural frame member adjacent the second side wall of the first hollow structural frame member for injecting the foam material or another foam material.

According to another embodiment, a method of assembling frame members of a recreational vehicle component includes the steps of providing a first structural frame member having a hollow space therein, providing a second structural frame member, inserting a section of the second structural frame member into the hollow space of the first structural frame member, and injecting an expandable foam into the hollow space adjacent the section to thereby couple the second structural frame member to the first structural frame member.

In one embodiment, the method further includes forming an injection port in the first structural frame member, and the injecting includes injecting the expandable foam into the hollow space through the injection port.

In one embodiment, the injecting includes injecting an expandable foam that becomes rigid when cured. Alternately, the expandable foam may remain compressible or resilient when cured.

In a further embodiment, the method further includes providing a third structural frame member and inserting a section of the third structural frame member into the hollow space of the first structural frame member. The injecting including injecting the expandable foam into the hollow space adjacent the section of the third structural frame member to thereby couple the third structural frame member to the first structural frame member.

In yet another embodiment, a structural assembly for a recreational vehicle includes a hollow structural frame member having upper and lower walls and two opposed side walls joining said upper and lower walls together. One of the side walls and the upper and lower walls each having a notch formed therein in to allow the structural frame member to bend about the notch and form a bent structural frame member. A foam material located in the hollow space on either side of the notch to form a bearing member therein for resisting bending and/or torsional about the notch.

In one form, the foam material has adhesive properties to adhere to the inside surface of the hollow structural frame member to further strengthen the joint formed at the notch.

Accordingly, a frame is disclosed that can be easily assembled and, further, that can exhibit added rigidity and/or controlled flexibility.

DETAILED DESCRIPTION OF THE FIGURES

FIG. 13 is an exploded perspective view illustrating the joint of FIG. 12;

DETAILED DESCRIPTION

Figure 1:
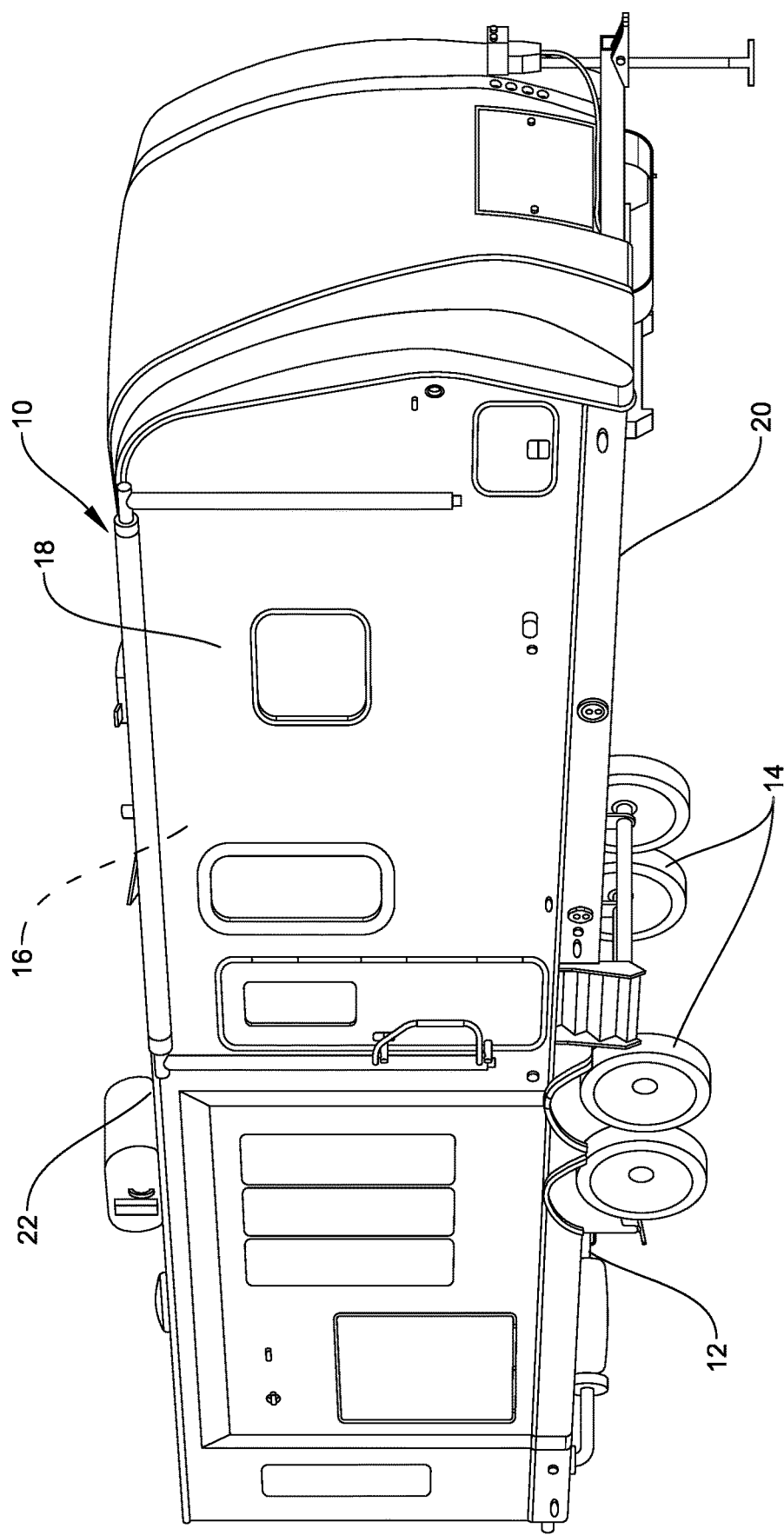
FIG. 1 is a perspective view of an exemplary recreational vehicle.
Figure 1A:
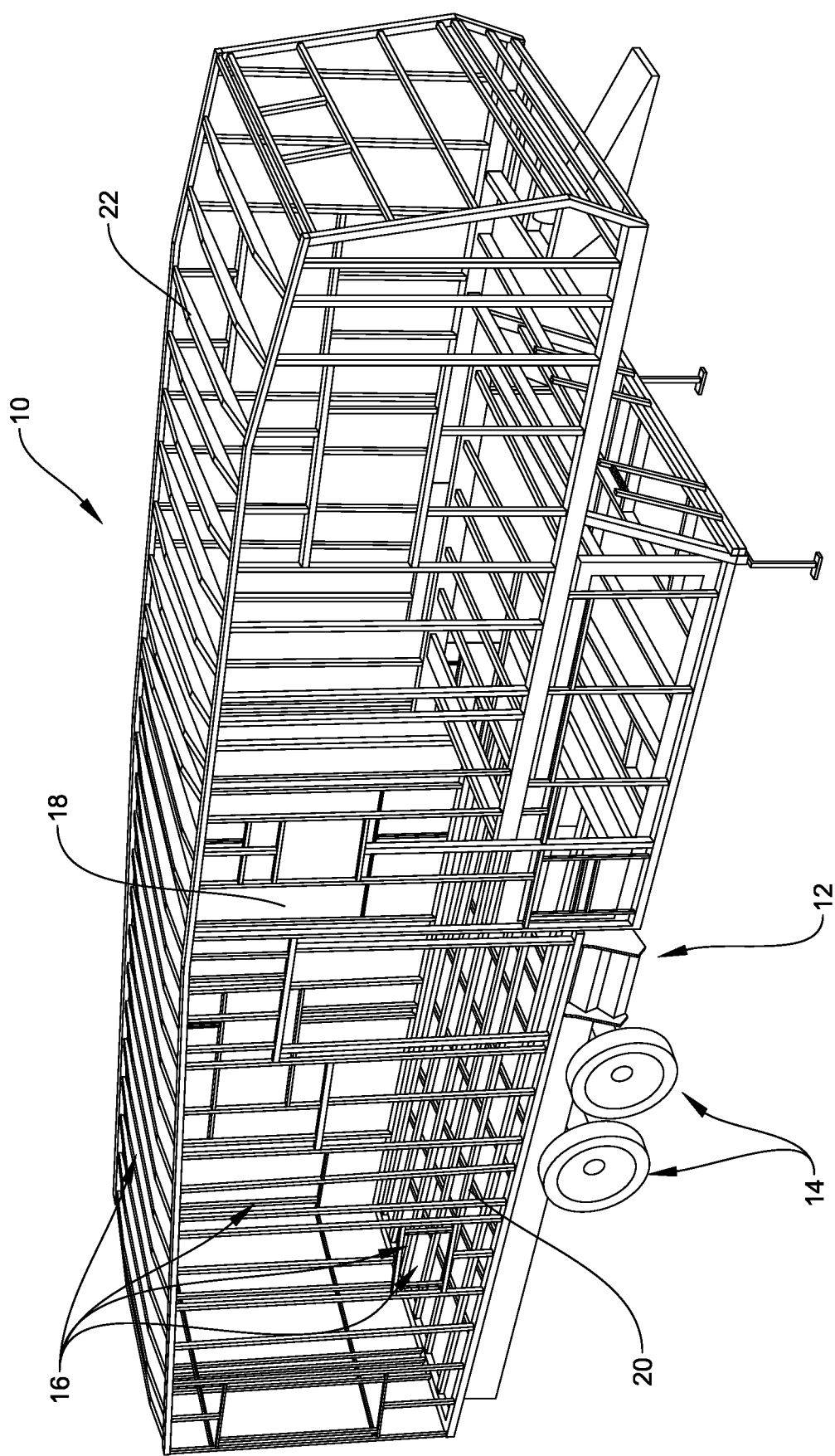
FIG. 1A is similar view to FIG. 1 but with the outer layers of the various panels removed to show the underlying frames.

Referring to FIGS. 1 and 1A, the numeral 10 generally designates a recreational vehicle (RV). Recreational vehicle 10 includes a chassis 12, a plurality of wheels 14, which are mounted to chassis 12, and a plurality of frames 16 that form structural panels (or are covered with panels) to form walls, such as sidewalls 18 and interior walls (not shown), a floor 20 (FIG. 4), and/or ceiling/roof 22, which are mounted to the chassis 12 and assembled together form the RV cabin. As will be more fully described below, the frames 16 that form the structural panels (including sidewalls 18, floors 20, and ceiling/roof 22, as well as interior or partitions walls, including accessory compartments frames (not shown)) or to which the structural panels are mounted, may be formed using the frame and frame assembly method described below. Although described in reference to a structural frame for an RV, it should be understood that the frame and frame assembly method described below may be used to form or assemble other frames. For the purposes of this disclosure, the focus of the description will be on how the structural frame members of the frame 16 are joined.

Figure 2:
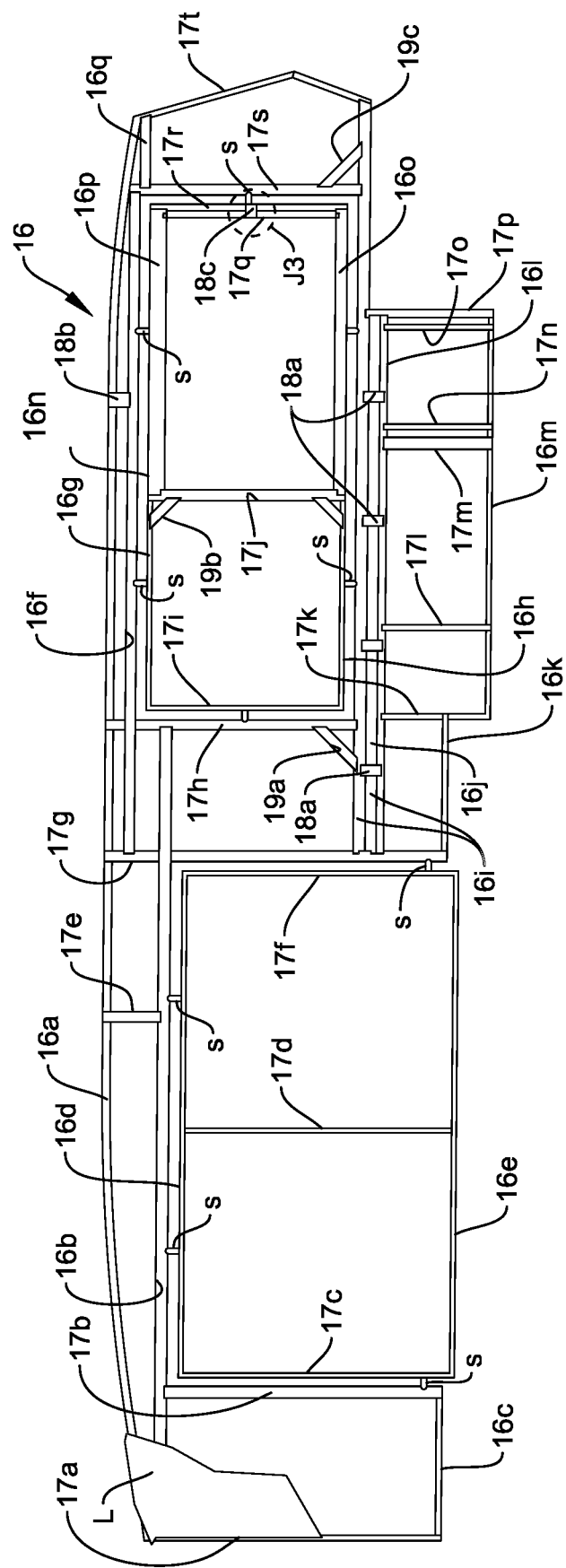
FIG. 2 is a side view of a recreational vehicle side panel with the outer layers removed to show the underlying frame and frame members.

Referring to FIG. 2, for example, the frame 16 of side wall 18 includes a plurality of horizontal and generally horizontal structural frame members 16a-16q, vertical and generally vertical structural frame members 17a-17t, a plurality of structural frame members 18a, 18b, and 18c that form connectors, structural frame members 19a, 19b, and 19c that form brace members, and structural frame members S that form offset supports or spacers, which are joined to form the frame 16. Several variations of joining methods are described below, including interlocking of the structural frame members and then optionally welding the structural frame members together. Further, as will be more fully described the structural frame members may be marked, such as by lettering or color coding, to assist in the assembly of the interlocking parts, which may eliminate the need for fixturing.

The terms upper and lower, left, right, vertical and horizontal are just used in reference to the orientation shown in FIG. 2. Further, it should be understood that additional structural frame members (not illustrated) may form part of the frame, including curved frame members and frame members that are arranged to frame in and reinforce other openings, such as for doors or windows. Therefore, it should be understood that the frame and method of assembling the frame described below may be adjusted and configured to form a variety of different frame configurations.

Figure 3:
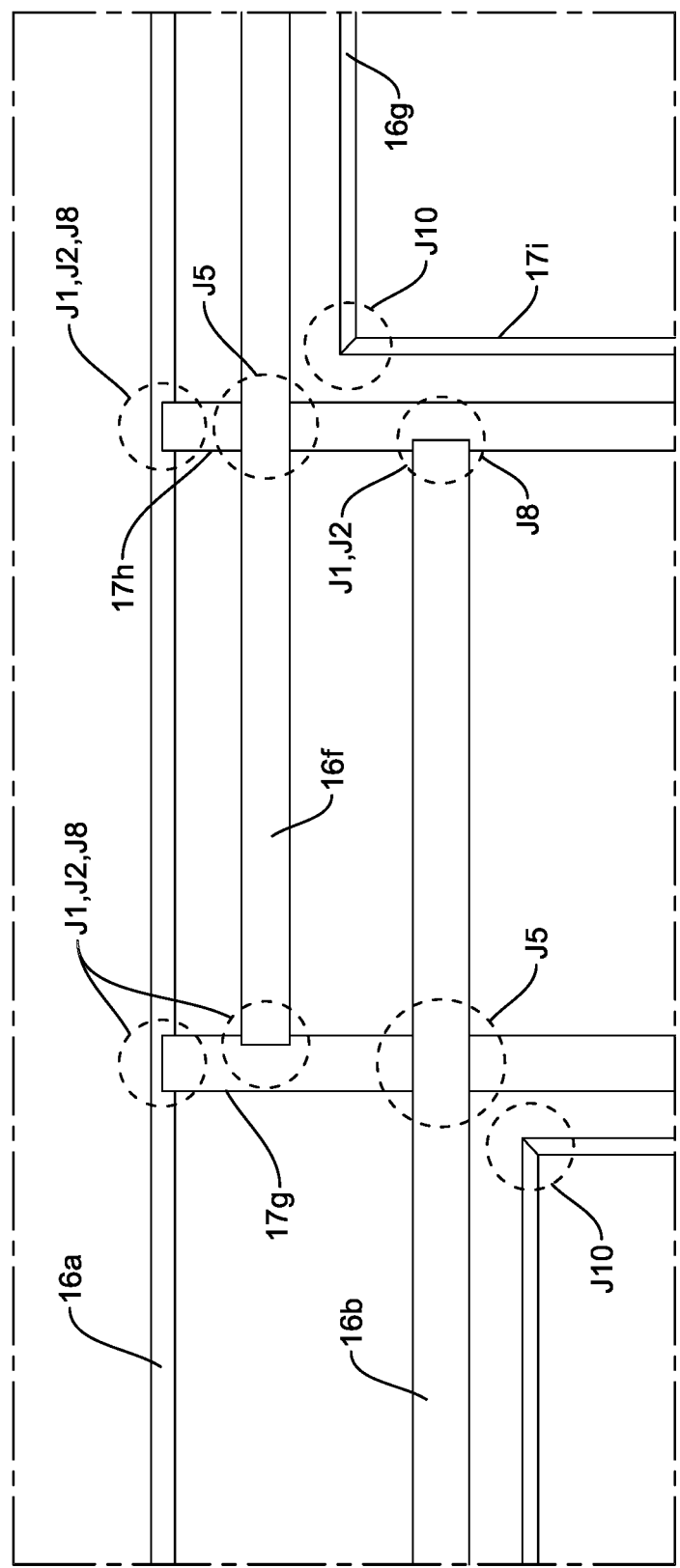
FIG. 3 is an enlarged view of detail III-III of FIG. 2.
Figure 4:
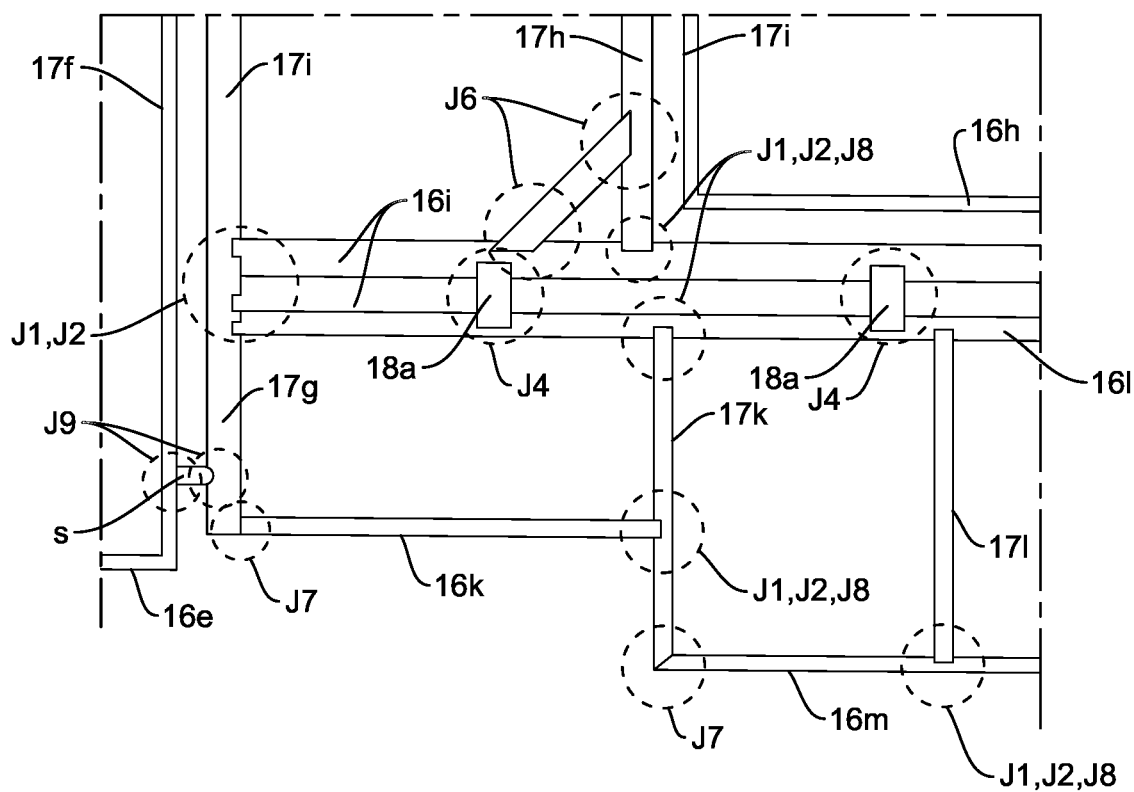
FIG. 4 is an enlarged view of a section of the frame of FIG. 3.
Figure 5:
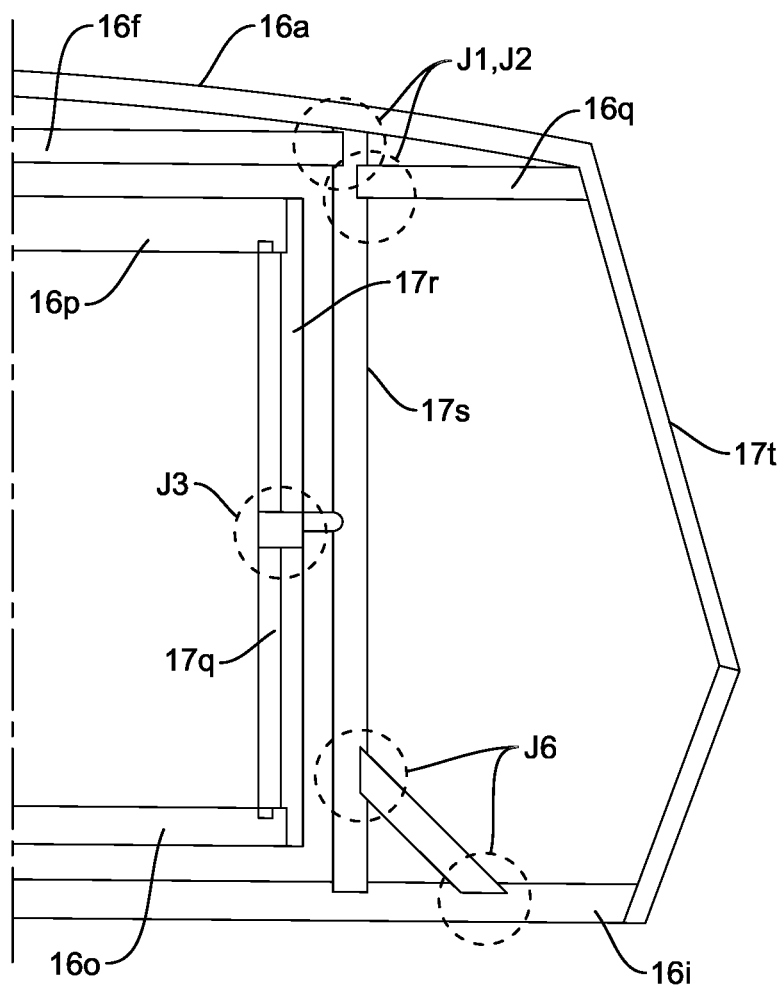
FIG. 5 is an enlarged view of another section of the frame of FIG. 3.
Figure 17:
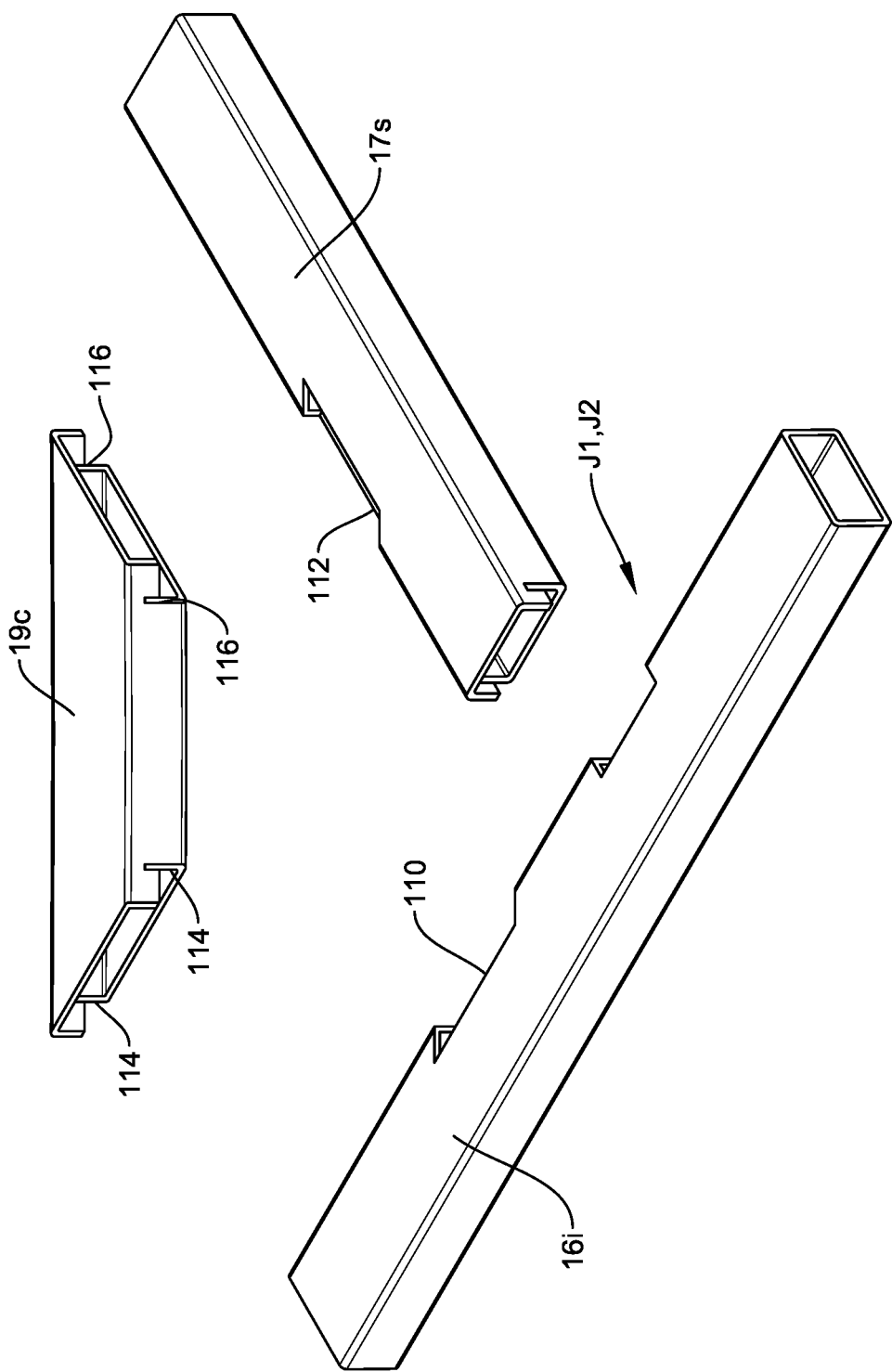
FIG. 17 is an exploded perspective view illustrating the joint of FIG. 16.
Figure 18:
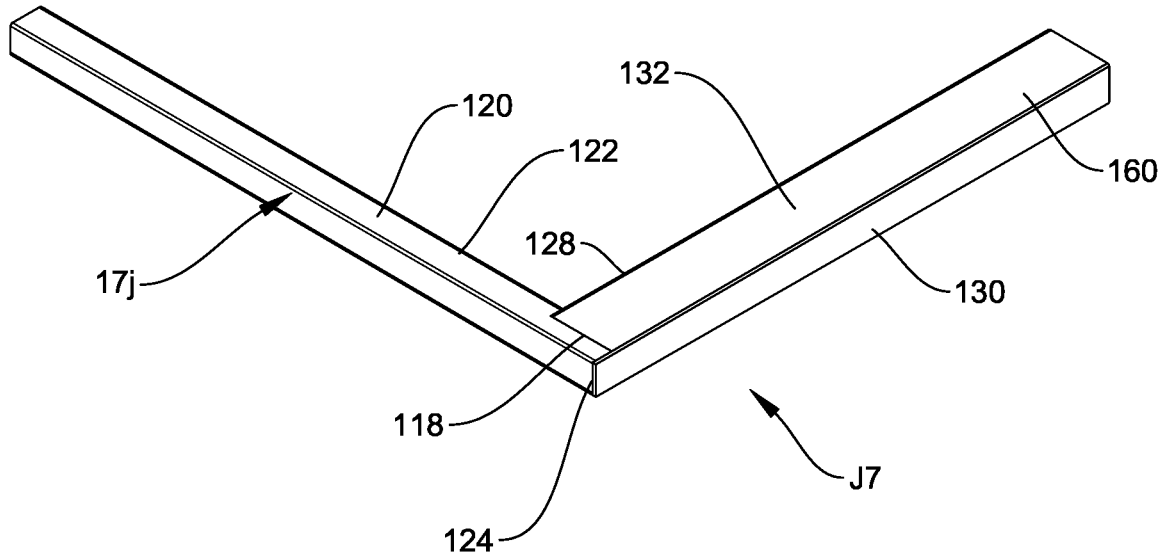
FIG. 18 is an enlarged fragmentary perspective view of another joint.
Figure 18A:
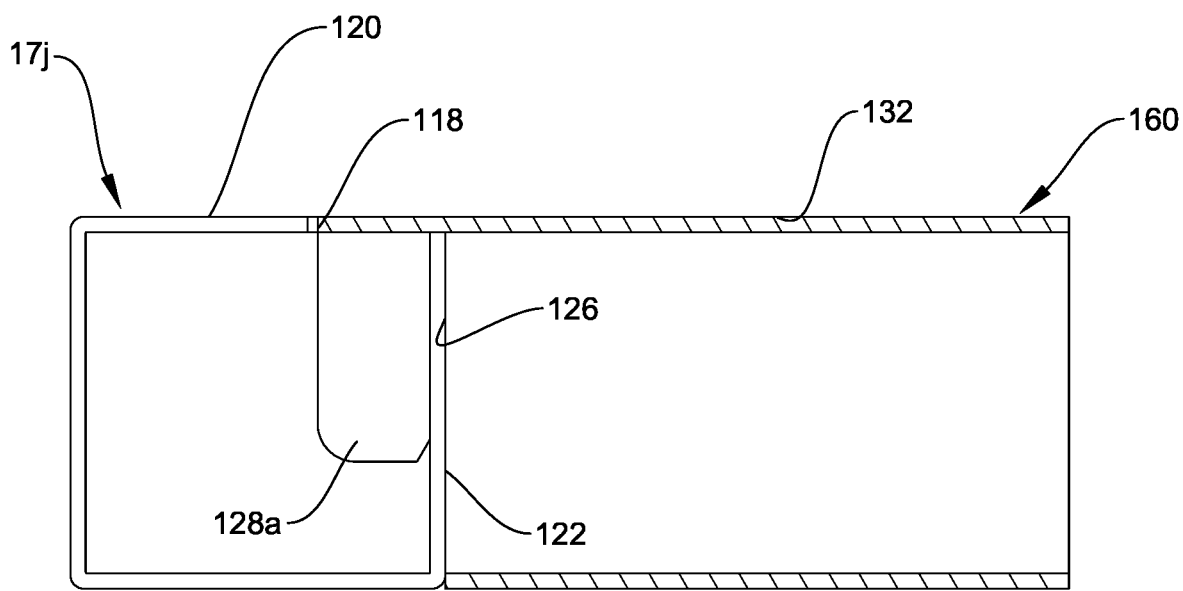
FIG. 18A is a cross-section view taken along line XVIIIA-XVIIIA of FIG. 18.
Figure 19:
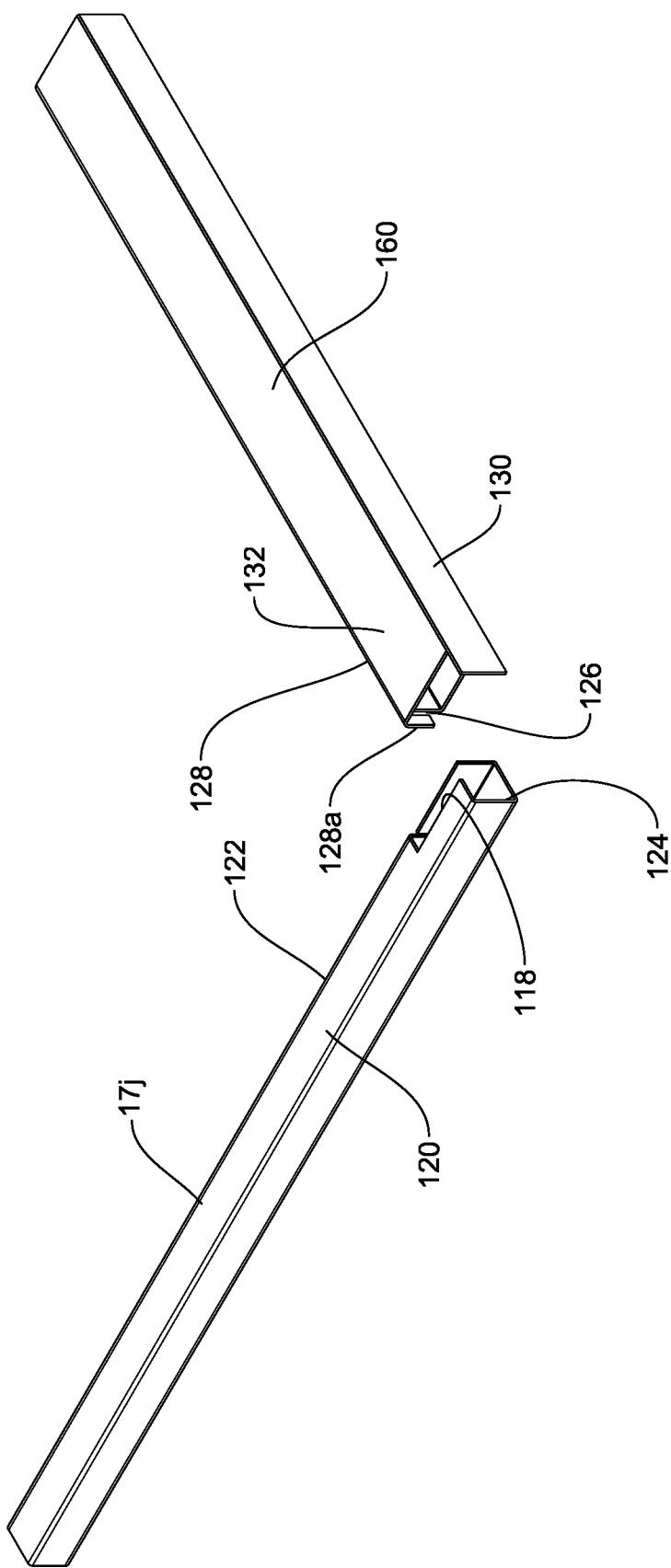
FIG. 19 is an exploded perspective view illustrating the joint of FIG. 18.

Referring to FIGS. 3 and 4, for example, some of the structural frame members may be joined: At right angles (i.e. orthogonal) to each other, such as using a joint J1 (e.g. FIGS. 6, 6A, 7, 16, 17, 21A, 21B, 21C), joint J2 (e.g. FIGS. 8, 8A, and 9), joint J5 (e.g. FIGS. 14, 14A, 14B, and 15), joint J7 (e.g. FIGS. 18, 18A, and 19), joint J8 (e.g. FIGS. 20, 21, 21A, 21B, 21C), joint J9 (e.g. FIGS. 22 and 23), joint 11 (e.g. FIGS. 32-, 33); joined parallel to each other, such as by joint J3 (e.g. FIGS. 10, 10A, and 11), joint J4 (e.g. FIGS. 12, 12, and 13); or joined at a non-orthogonal angle to each other, such as joint J6 (e.g. FIGS. 16 and 17) or joint J10 (e.g. FIGS. 24 and 25), or using a combination of joints (see for example FIGS. 16, 21A, 22, 23, and 26), which interlock one or more structural frame members together.

Figure 6:
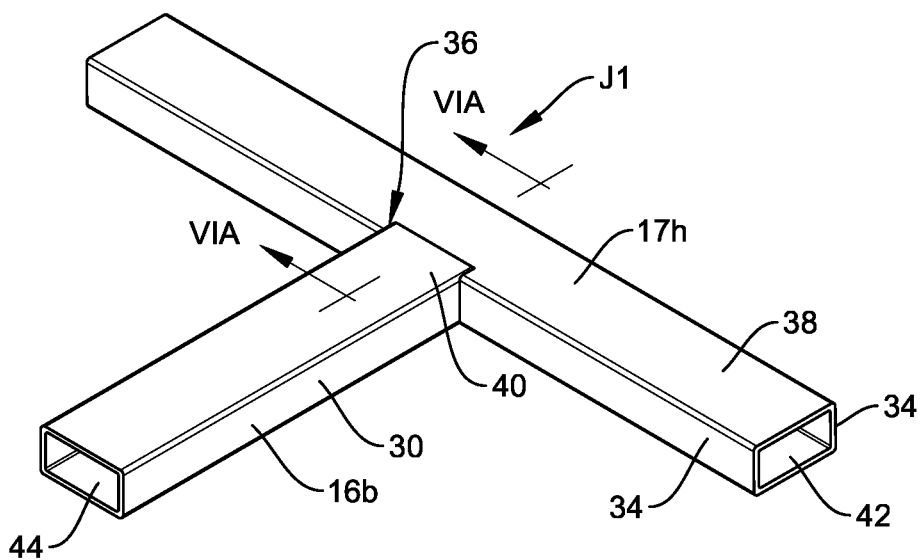
FIG. 6 is an enlarged fragmentary perspective view of two joined structural frame members.
Figure 6A:
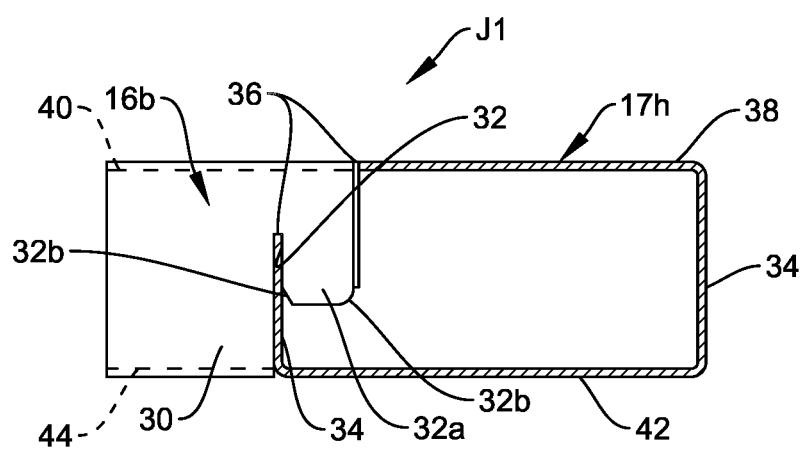
FIG. 6A is a cross-section view taken along line VIA-VIA of FIG. 6.
Figure 7:
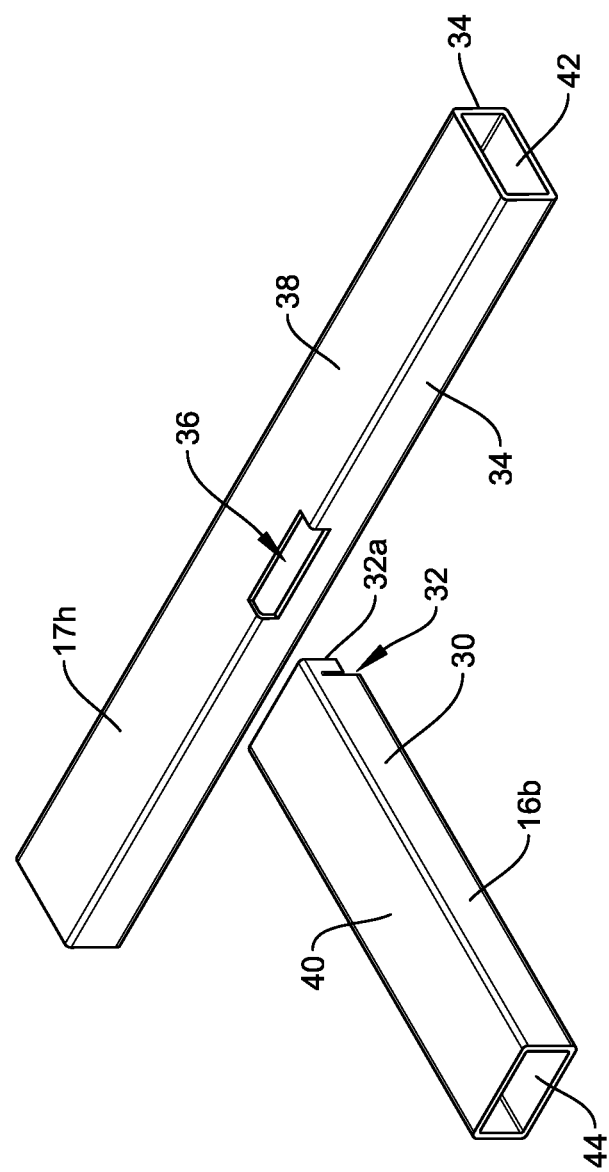
FIG. 7 is an exploded perspective view illustrating the joint of the two joined members of FIG. 6.

Referring to FIGS. 6, 6A, and 7, joint J1 is formed by two or more orthogonal structural frame members—for example, a first structural frame member 17h and a second structural frame member 16b, which form a T-shaped joint. Though, as described below, a third structural frame member may be attached to first structural frame member 17h on the opposed side from structural frame member 16b using the same joint to form a cross-shaped joint. The reference to first and second (or third) in regard to the structural frame members should not be construed to be limiting and is just used to provide a frame of reference.

As understood from FIG. 7, each of the side walls 30 of the second structural frame member 16b has a narrow notch 32 in the form of a slot to form tabs 32a. Slots 32 are sized and configured for receiving the side wall 34 of the first structural frame member 17h through a notch 36 formed at least in the upper wall 38 of the first structural frame member 17h, and, optionally, in both the upper wall 38 and the side wall 34 of the first structural frame member 17h.

Slots 32 extend up into side walls 30 from their lower ends or sides (as seen in FIG. 7) to form tabs or fangs 32a that are used to extend into the notch 36 to thereby engage the side wall 34 from the interior side of the of first structural frame member 17h. Optionally, the height of each of the tabs 32a may be the same or less than the height of the side walls 30 of first structural frame member 16b. Thus, each of the side walls of the second structural frame member has a first section on one side of the slot 32 with a first height and a second section on the opposed side of the slot 32 with a second height that is different, e.g. shorter, than the first height to thereby form tabs 32a with a shorter height than the first sections (e.g. remainder) of the side walls for insertion into the notch in the first structural frame member. As it would be understood with tight tolerances, the shorter the slot 32, the easier it may be to assemble.

Further, the upper wall 40 of the second structural frame member 16b may extend to the distal end of the second structural frame member. In this manner, upper wall 40 can extend into and be located in the notch 36 when the second structural frame member 16b is engaged with the first structural frame member 17h, such as shown in FIG. 6A. As a result, the notch 36 straddles the upper wall at the end of the second structural frame member 16b. Further, upper wall 40 may be coplanar or flush with the upper wall 38 of first structural frame member 17h.

In the illustrated embodiment, first structural frame member 17h and second structural frame member 16b each have closed rectangular tubular cross-sections with both upper walls 38, 40 and lower walls 42, 44. However, it should be understood that the structural frame members may have open cross-sections, such as L or C shaped cross sections, such as in structural angles or channels, etc. Optionally, in additional to upper wall 40 of second structural frame member 16b being coplanar with or coplanar or flush and extending into upper wall 38 of first structural frame member 17h, lower wall 44 may also be coplanar or flush, but adjacent lower wall 42 of first structural frame member 17h (FIG. 6A).

Optionally, as best understood from FIG. 6A, the illustrated embodiment, the notches 32 and 36 are sized to form a snug fit between the first structural frame member 17h and the second structural frame member 16b so that they form a tight, rigid connection. For example, the clearance between the notch 36 and the second structural frame member 16b may be an air gap, in a range of about 0 to 0.006 inches or in a range of 0 to 0.020 inches. Similarly, the clearance between the notch 32 and the side wall of the first structural frame member 17h may be an air gap, for example, in a range of about 0 to 0.006 of an inch or in a range of 0 to 0.02 of an inch. Alternately, the notches may be sized to provide a larger gap, for example, in a range of $1/64^{th}$ of an inch to $1/16^{th}$ of an inch or greater to provide some flexibility at the joint.

Consequently, when the second structural frame member 16b is fully engaged with the first structural frame member 17h, structural frame number 16b will transfer some of the forces at the joint to the upper wall of the first structural frame member 17h. Similarly, tabs 32a will engage the interior surface of the sidewall of the first structural frame member 17h thereby re-distribute some the stresses from the weld of welds, at the joint when welded, to other portions of the first structural frame member, which has been found to reduce stresses in the weld or welds. In other embodiments, when no welds are provided, this interlocking of the two structural frame members provide a sufficiently rigid joints for the frame, especially when combined with the laminations described below.

Referring again to FIG. 6A, optionally the ends 32b of tabs 32a may be rounded or tapered to facilitate insertion, but without significantly reducing the bearing surface between the tabs and the side wall of the first structural frame member 17h. For example, the tabs 32a and rounded tapered ends may be sized so that the tabs still contact at least 30% of the height of the side wall or greater of the first structural frame member 17h. As described below, by providing this internal interface and interlock between the two structural frame members, the stresses on any welds provided, for example, tack welds between the respective side walls of the structural frame members (for example, one of each side of the joint) may be reduced. Further, in some configurations the welds may be eliminated, with the strength of the panel relying on the laminated layers that are applied to both sides of the frame when forming the panels.

Figure 7B:
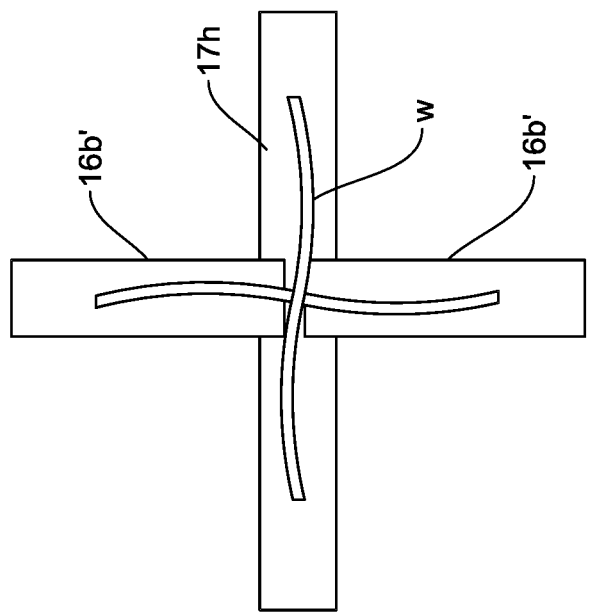
FIG. 7B is a top plan view of the joint of FIG. 7A illustrating adhesive applied to the upper walls of the joined structural frame members.
Figure 7A:
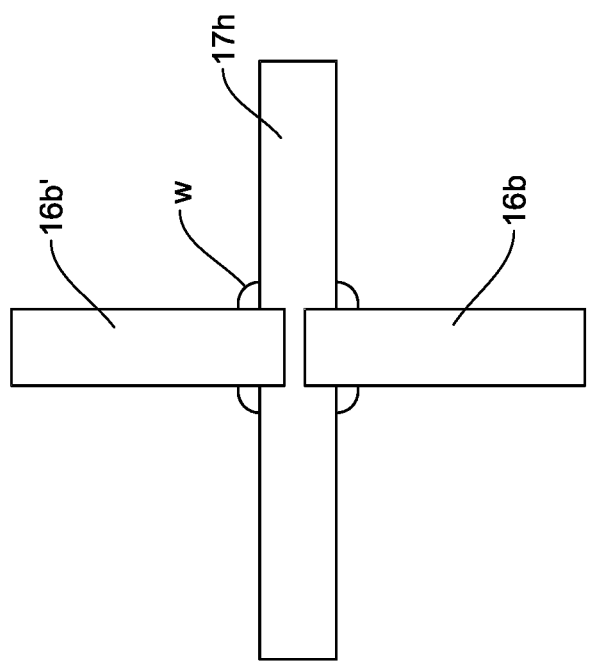
FIG. 7A is a top plan view of similar joint to the joint shown in FIG. 7 but with a third structural frame member illustrating optional weld or adhesive locations.

Referring to FIGS. 7A and 7B, a third structural frame member 16b' may be joined with structural frame member 17h using the same connection described above in reference to structural frame member 16b so that together structural frame members 16b, 16b' and 17h form a cross shaped configuration. As noted below, the structural frame members may be welded together using stitch welding or continuous welds W at their respective sidewalls, including a corner bead weld or welds, such as shown in FIG. 7A. Additionally or in lieu of the corner bead weld or welds, the structural frame members may be joined by one or more surface bead welds, for example on their upper and/or lower walls, such as understood from FIG. 7B. However, as noted above, sufficient strength to the frame may be provided by the laminated layers that are applied to both sides of the frame when forming the panels.

Although illustrated as hollow closed rectangular tubular members, as noted above, it should be understood that either one or both of the first structural frame member and the second structural frame member may have an open section and/or comprise a partially hollow member or a solid structural frame member but with a space formed in at least one of the structural frame members to allow for the internal interface and interlocking of the two members. Further, while illustrated with a rectangular cross-section, the shape of the cross-sections of both or any of the members may be varied.

Figure 8:
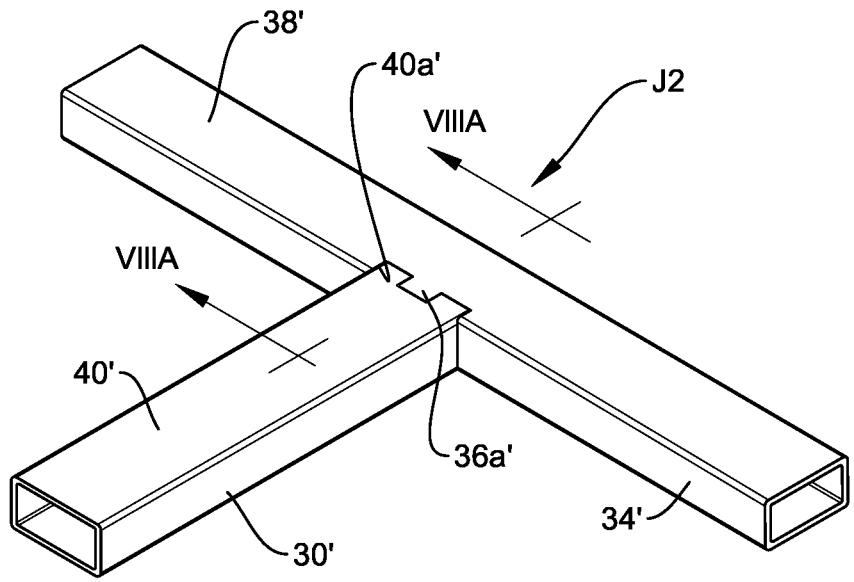
FIG. 8 is an enlarged fragmentary perspective view of another joint.
Figure 9:
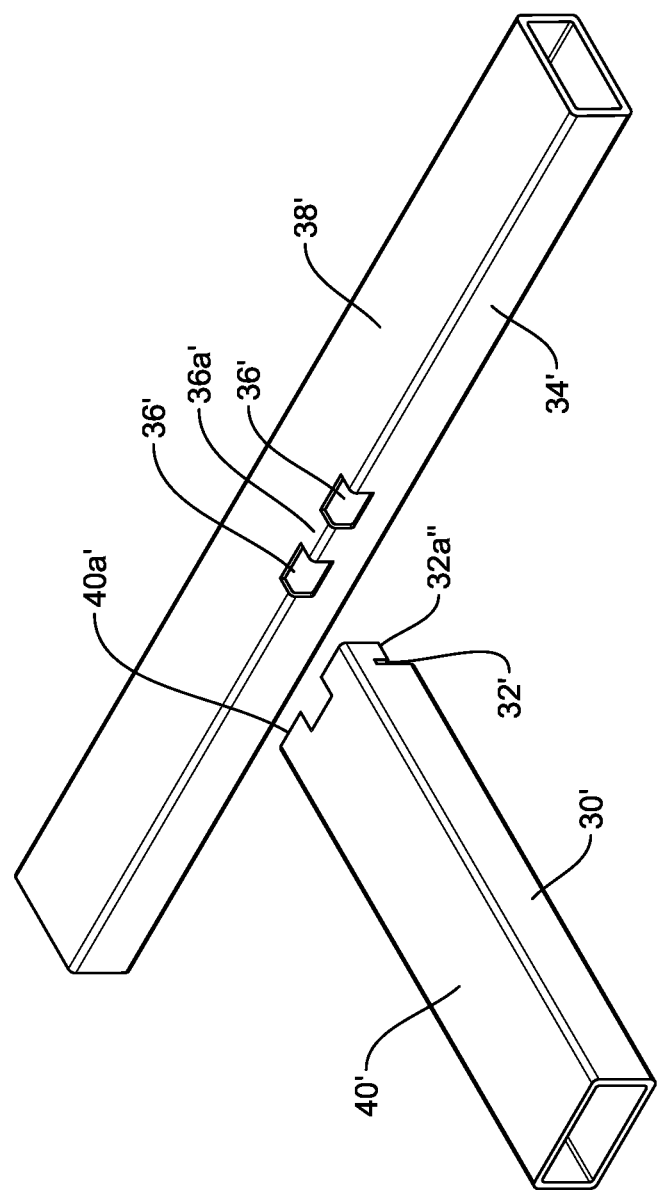
FIG. 9 is an exploded perspective view illustrating the joint of FIG. 8.

Referring to FIG. 8, in another embodiment, namely in joint 2, the upper wall 38' of the first structural frame member includes two notches 36', which are spaced apart by a section 36a' of upper wall 38', with each sized to receive a respective tab of tabs 32a'. Tabs 32a' are also formed by narrow notches 32' in the form of slots that extend up into the opposed side walls 30' of the second structural frame member. In this embodiment, the upper wall 40' of the second structural frame member has a forked or bifurcated end 40a' so that only portions of the upper wall 40 extend into the notches 36 of the first structural frame member. Further, the portions of the upper wall 40' that extend into the notches 36' may be coplanar or flush with the upper wall 38' of the first structural frame member.

Figure 8A:
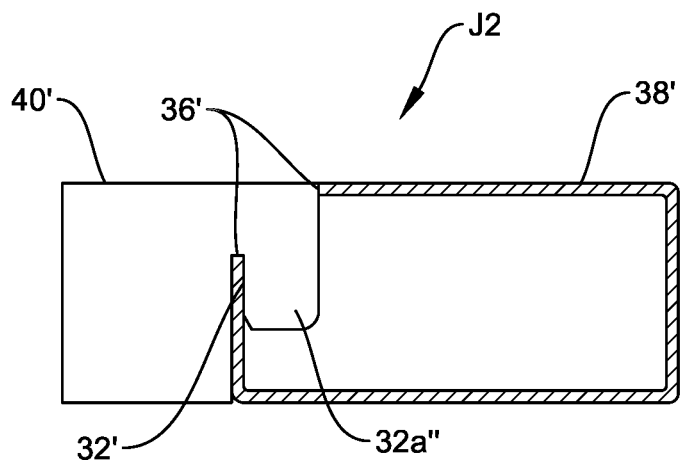
FIG. 8A is a cross-section view taken along line VIIIA-VIIIA of FIG. 8.

Again, the slots 32' are configured for receiving the side wall 34' of the first structural frame member through notches 36'. Optionally, similar to the previous embodiment, the height of each of the tabs 32a' may be the same or less than the remainder of the side walls 30' of the first structural frame member. Additionally, as noted in reference to the above embodiment, and as shown in FIG. 8A, the slots and notches may be sized to form a snug fit connection at the joint or may provide gaps to introduce some flexibility into the joint.

In the above embodiments, the structural frame members are angle at ninety degrees (orthogonal) to each other. Referring to FIGS. 10, 10A, 11, 12, 12A, and 13, the structural frame members may be parallel, with another structural frame member straddling at least a portion of the parallel structural frame members to interlock them together.

Figure 10:
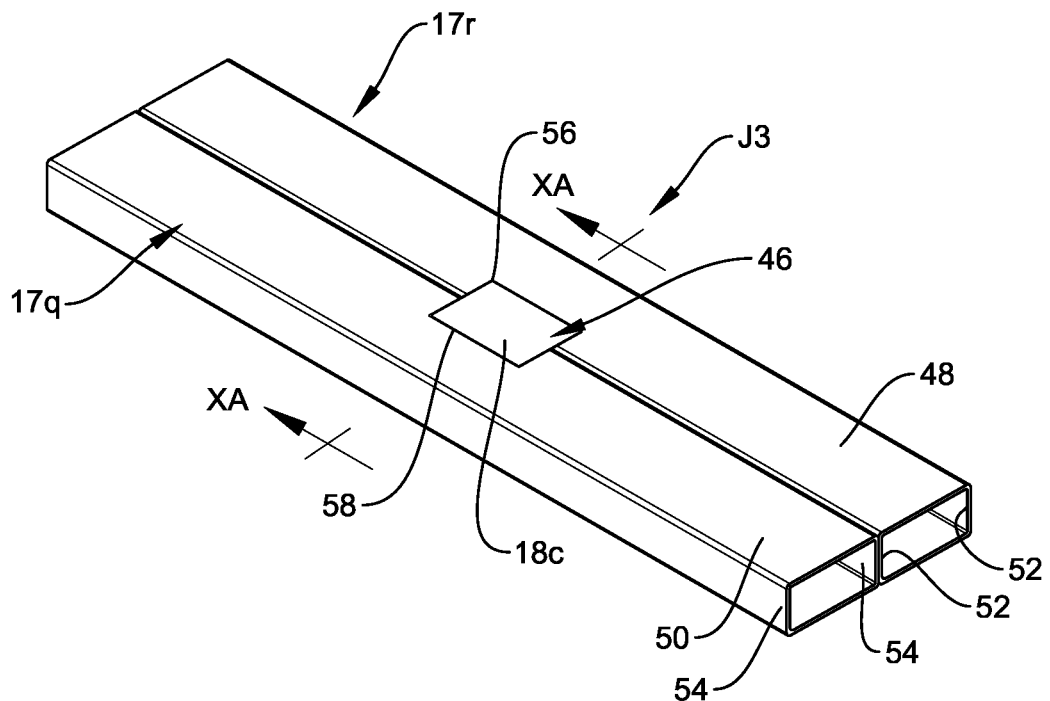
FIG. 10 is an enlarged fragmentary perspective view of another joint.
Figure 10A:
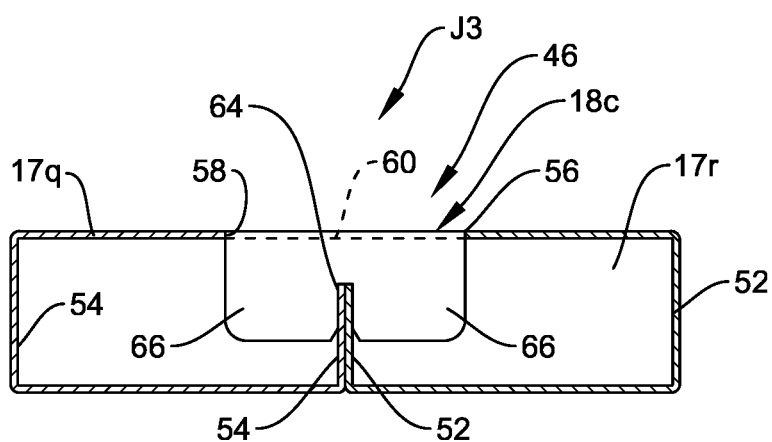
FIG. 10A is a cross-section view taken along line XA-XA of FIG. 10.
Figure 11:
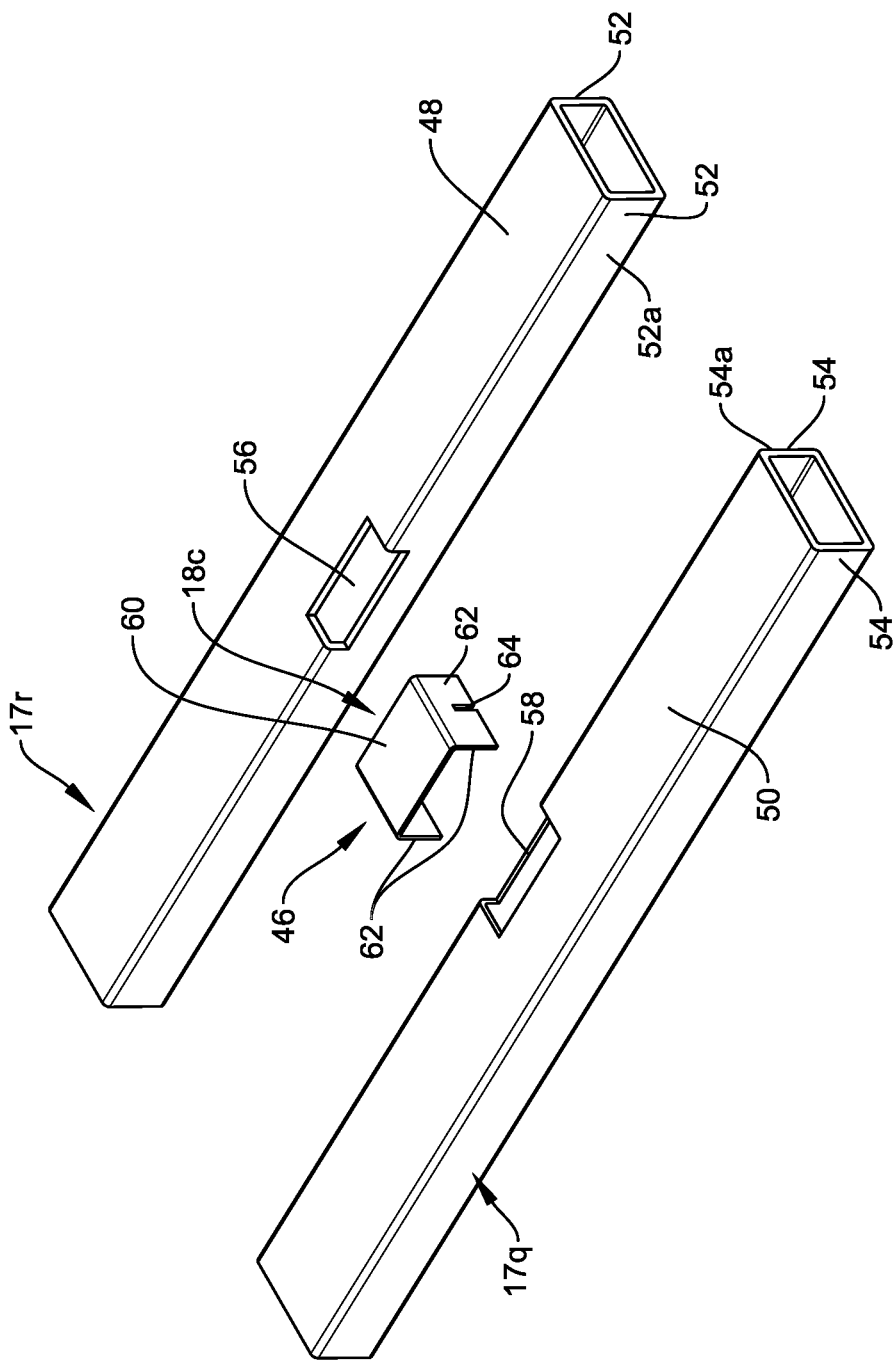
FIG. 11 is an exploded perspective view illustrating the joint of FIG. 10.

As best seen FIGS. 10, 10A, and 11, first and second structural frame members 17r and 17q are interlocked by a third channel shaped structural frame member 46. Each of the first and second structural frame members 17r and 17q has an upper wall 48, 50 and a pair of opposed side wall 52, 54 depending from their respective upper wall 48, 50. In the illustrated embodiment, the inner side walls 52a, 54a of each of the first and second structural frame members 17r and 17q contact and abut each other—but it should be understood that they may be spaced from each other with the channel shaped structural frame member 46 lengthened to extend and span between the two structural frame members, and further provided with a slot for each of the side walls (such as shown in FIG. 13) rather than a shared slot, which is shown in FIGS. 10A and 11. For example, see structural frame member 18b (FIG. 2).

Each upper wall 48, 50 has a notch 56, 58 at its respective side wall, which optionally extends into the side wall (similar to the previous embodiments). The channel-shaped structural frame member 46 has a web that forms an upper wall 60, and a pair of downwardly depending flanges that form opposed side walls 62. Each of the side walls 62 has a narrow notch in the form of a slot 64, which divides the side walls 62 into two tabs 66 (or fangs). Optionally, each tab is substantially the same size, for engaging and straddling both of the abutting side walls of the first and second structural frame members through the notches 56, 58 (FIG. 10A). Although illustrated as having the same heights, tabs 66 may have different heights to provide different stiffnesses to the joint or simply to facilitate assembly. Further, the widths of the tabs may vary to vary the stiffness of the joint or simply to accommodate different size first and second structural frame members 17q and 17r.

Optionally, similar to the first two embodiments, the upper wall of the channel-shaped structural frame member may be coplanar or flush with one or both of the upper walls of the first and second structural frame members. Again, the size of the notches (56, 58, 64) are selected to provide a snug fit connection, such as shown in FIG. 10A, or may be increased to introduce flexibility, such as described above. Additionally, similar to joint J2, notches 56 and 58 may be each formed from a pair of notches (both or just one), with upper wall 60 of member 46 having one or both sides having a forked configuration to extend into the spaced notches.

Figure 12:
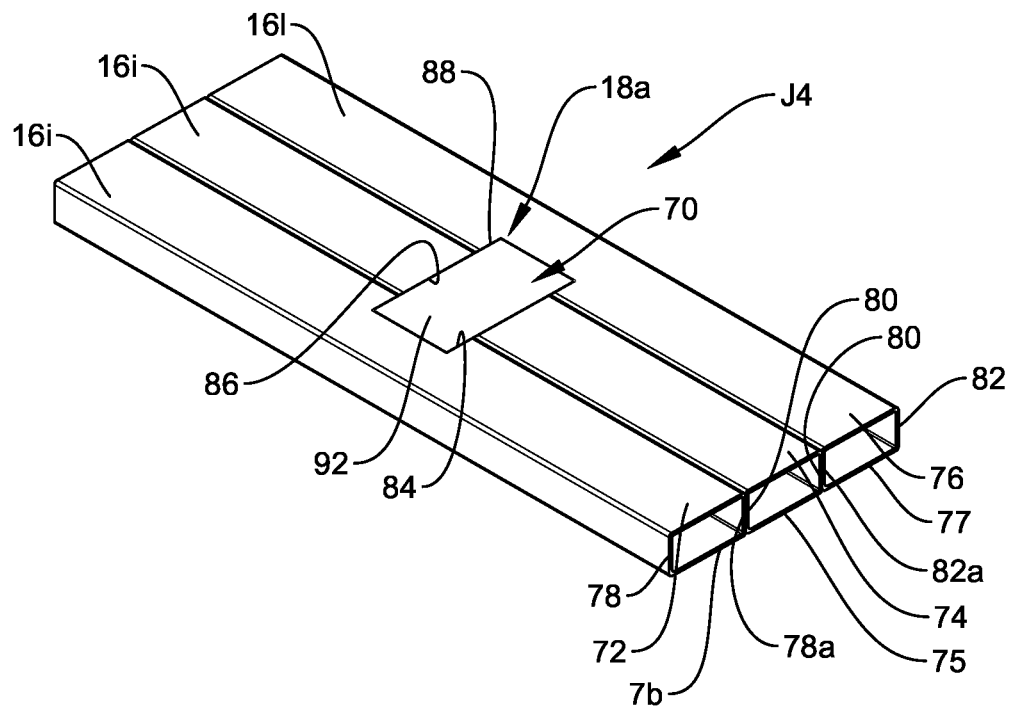
FIG. 12 is an enlarged fragmentary perspective view of another joint.
Figure 12A:
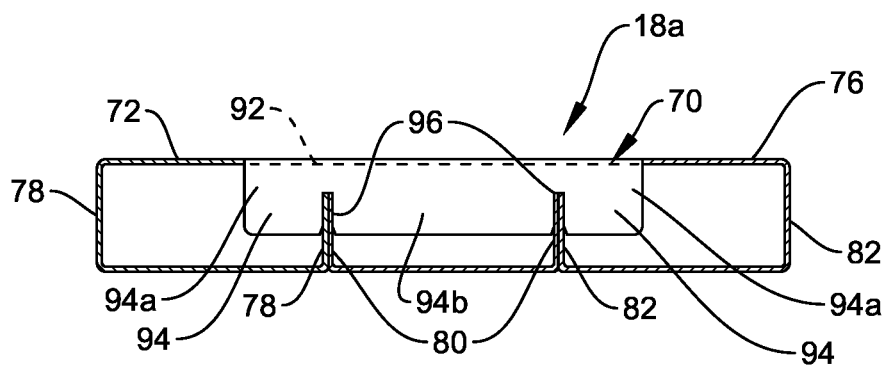
FIG. 12A is a cross-section view taken along line XIIA-XIIA of FIG. 12.
Figure 14:
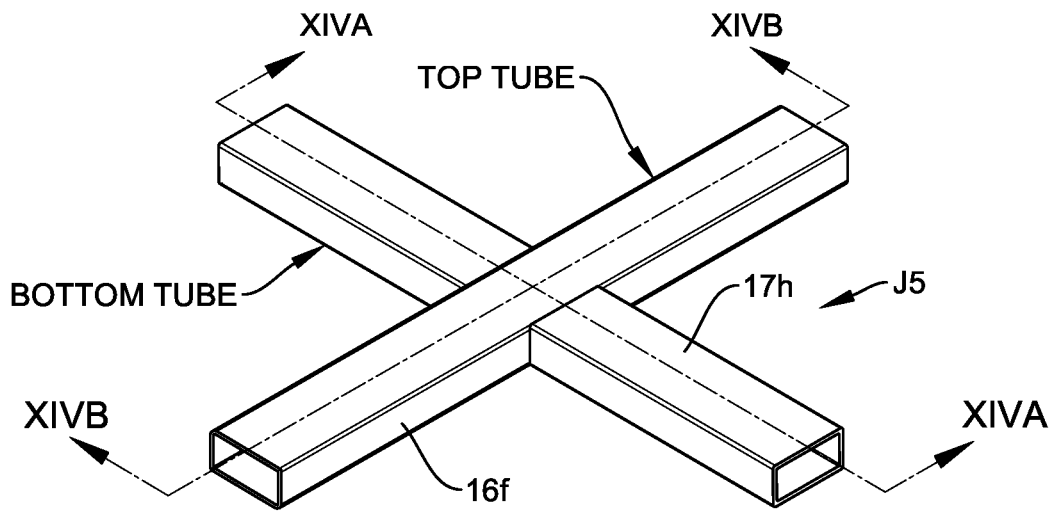
FIG. 14 is an enlarged fragmentary perspective view of another joint.
Figure 14A:
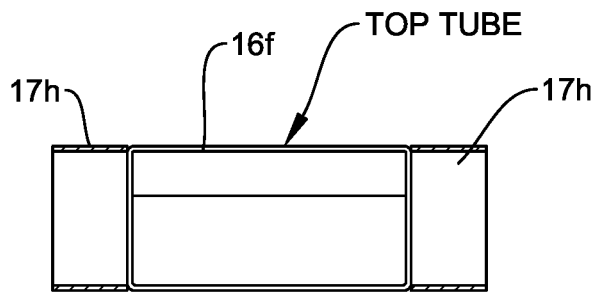
FIG. 14A is a cross-section view taken along line XIVA-XIVA of FIG. 14.
Figure 14B:
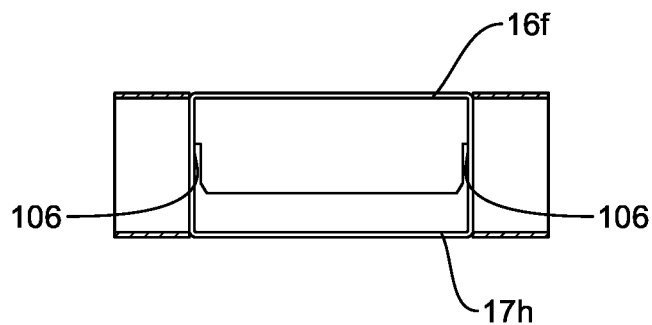
FIG. 14B is a cross-section view taken along line XIVB-XIVB of FIG. 14.

As best seen FIGS. 12, 12A, and 13, three parallel structural frame members, such structural frame members 16i, 16i, and 16l, may be interlocked using structural frame member 18a. Similar to the previous embodiment, structural frame member 18a straddles between the three structural frame members 16i, 16i, and 16l and is also formed by channel shaped structural frame member 70. Each of the structural frame members has an upper wall 72, 74, 76 and a pair of opposed side wall 78, 80, 82 depending from their respective upper wall 72, 74, 76. In the illustrated embodiment, the inner side walls 78a and 82a contact and abut the respective side walls 80 of the middle, second structural frame member 16i. Again it should be understood that they may be spaced from each other with the channel shaped structural frame member 46 lengthened to extend and span between the spaced structural frame members, and further provided with additional notches to independently engage each of the side walls.

Each upper wall 72, 74, and 76 has a notch 84, 86, 88 at the side wall, which optionally extend into the respective side wall, as seen in FIG. 13, with sufficient depth to allow member 16i be coplanar or flush with each of the structural frame members. Further, notch 86 of the central structural frame member 16i spans the full width of the upper wall 74. As noted, notch 86 optionally extends into each of its side walls 80 at a sufficient depth so that channel-shaped member 70 may traverse and nest in the central structural frame member in notch 86 and similarly extend and nest in notches 84 and 88 of structural frame members 16i and 16l so that channel-shaped member 70 nests in all three structural frame members to form a coplanar or flush arrangement.

Channel-shaped member 70 has a web 92, which forms an upper wall (which optionally is coplanar or flush with upper walls 72, 74, and 76), and a pair of downwardly depending flanges 94, which form opposed side walls. Each of the flanges 94 has a pair of narrow notches that form slots 96, which divide the respective side walls into three tabs 98 (or fangs) for engaging the abutting side walls of the first, second, and third second structural frame members through the notches 84, 86, and 88. Similar to the previous embodiment, slots 96 may be sized to engage two side walls, which may or may not have the same thickness.

Although illustrated as having the same heights, tabs 98 may have different heights. Further, the width of each tab may vary—for example, in the illustrated embodiment, the outer tabs 94a are narrower in width than the central tab 94b, which spans across the full internal width of the central structural frame member 16i. However, it should be understood that the central tab 94b may be at least partially bifurcated with a central narrow notch dividing the central tab into two tabs. For example, the central narrow notch may have the same height as notches 96 or may be shorter or longer and/or narrower or wider.

Optionally, similar to the first two embodiments, as noted, the upper wall of the channel-shaped structural frame member may be coplanar or flush with one, two or all of the upper walls of the first, second, and third structural frame members. For further optional additional details about the tabs and about clearances or gaps between member 18a and members 16i, 16j, and 16l, reference is made to the above description.

Figure 15:
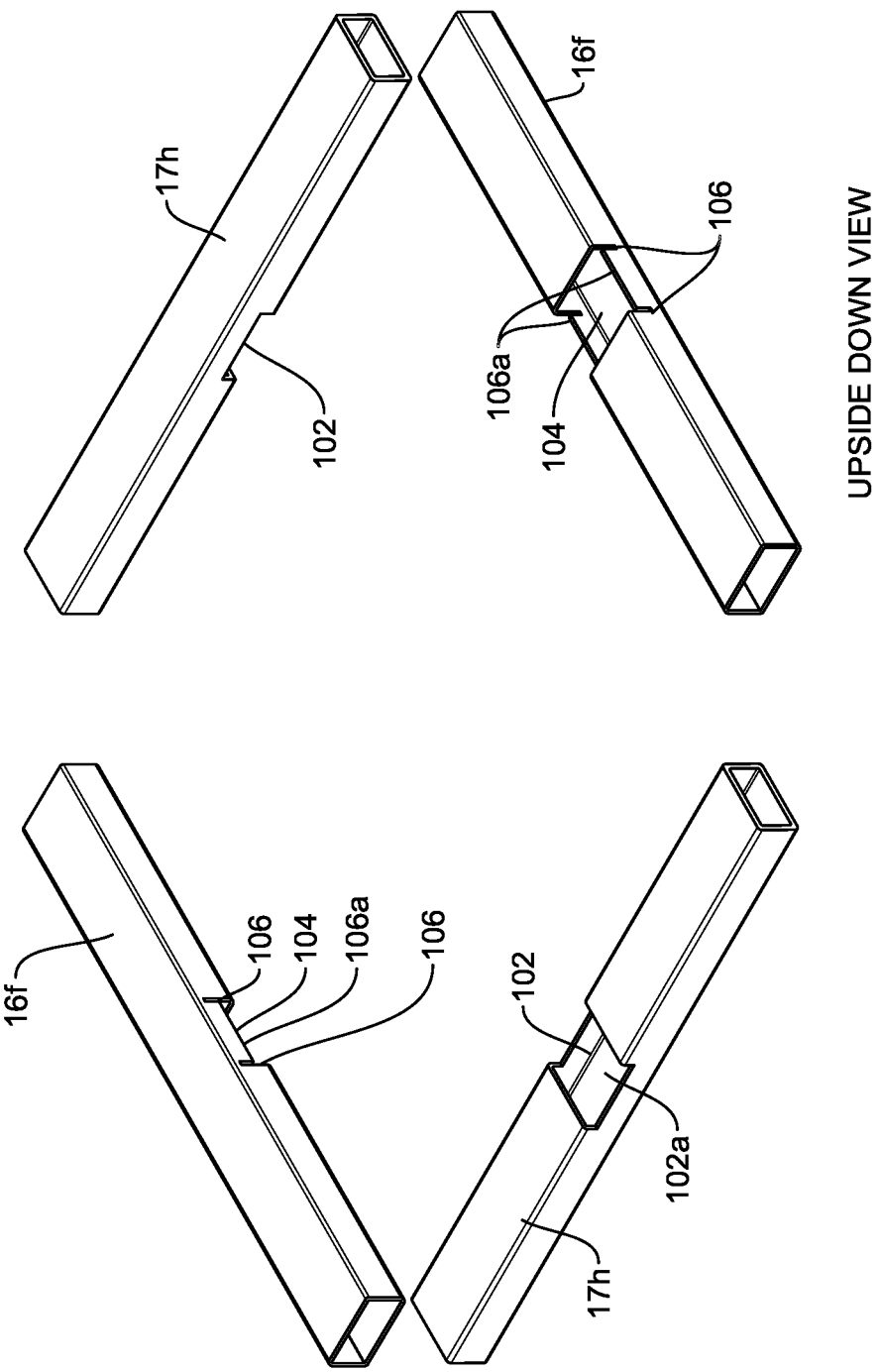
FIG. 15 is an exploded bottom perspective view illustrating the joint of FIG. 14.

Referring to FIGS. 14, 14A, 14B, and 15, two structural frame members, such as structural frame members 16f, 17h may be arranged so that one structural frame member crosses or transverses the other frame member to form a cross-shaped interlocking joint J5. As best seen in FIG. 15, the interlocking joint J5 is formed by a notch 102, 104 formed in each structural frame member 16f, 17h. One of the notches 104 has extended portions on its opposed sides forming slots 106 (FIGS. 14B and 15) to receive the side wall of the other structural frame member to form a central, elongated tab 106a on each side to extend into the hollow space 102a of structural frame member 17h. Each notch 102 and 104 transverses the width of each respective structural frame member and, further, is sized so that the upper wall of each structural frame member is coplanar or flush with the upper wall of the other structural frame member.

Although illustrated with a single, sold tab 106a on each side of structural frame member 16f, which extends the full width of the structural frame member 17h, it should be understood that one or both tabs may be bifurcated by an additional central narrow notch.

Figure 16:
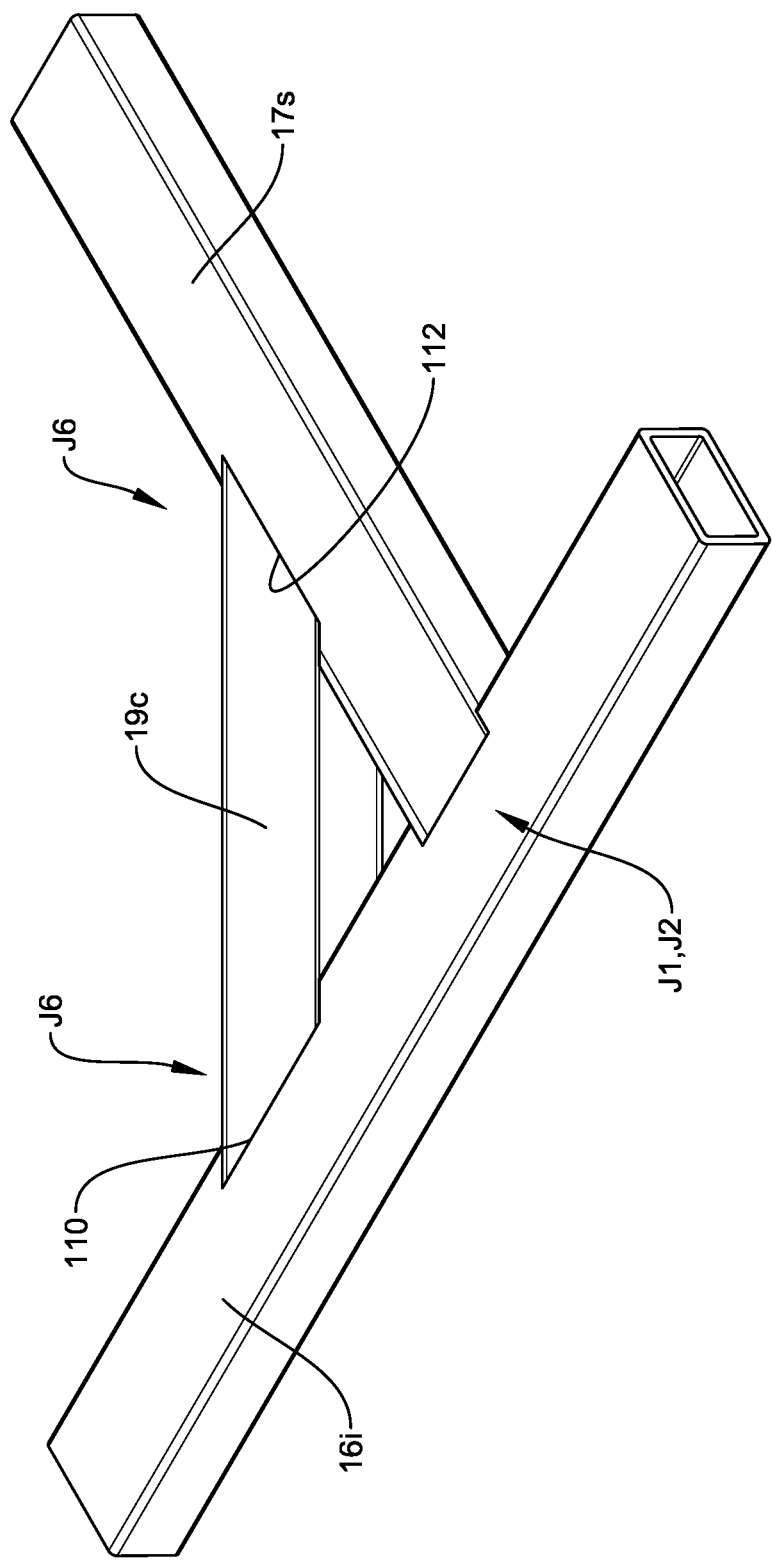
FIG. 16 is an enlarged fragmentary perspective view of another joint.

In yet other embodiment, as shown in FIG. 16, two structural frame members, such as structural frame members 19c and 16i, may be arranged so that one structural frame member forms a non-orthogonal angle with respect to the other. For example, interlocking joint J6 may be formed by an angled notch 110 in one structural frame member 16i and a pair of the slots 114 (FIG. 17) formed in the opposed side walls of the other structural frame member 19c, but which are offset from each other so that they can engage the angled side wall and notch of the respective side wall of structural frame member 19c. Similarly, the opposed end of the angled structural frame member 19c may have a pair of slots 116 to engage an angled notch 112 formed in a third structural frame member, such as structural frame member 17s. Structural frame member 17s may be orthogonal to member 16i and, further, may be interlocked to member 16i using joint J1 or J2, described above.

Additional joints may be formed, for example at the ends of two abutting structural frame members, such as first and second structural frame members 17j and 16o (FIG. 2). For example, referring to FIG. 18, a notch 118 may be provided that extends through the upper wall 120 of structural frame member 17j and into side wall 122 and, further, to the terminal end 124 of first structural frame member 17j. Notch 126, which forms a slot, may be formed in one side wall 128 of second structural frame member 16o to form a tab 128a to engage the side wall 122 of the first structural frame member, so that the opposed side wall 130 of the second structural frame member 16o abuts the distal end 124 of the first structural frame member 17j (see FIG. 18).

Similarly the upper wall 132 of the second structural frame member may extend into the notch 120 and, further, be coplanar or flush with the upper wall 122 of the first structural frame member. Optionally, as noted above, one or more welds may be provided between the respective side walls of the two structural frame members.

Figure 20:
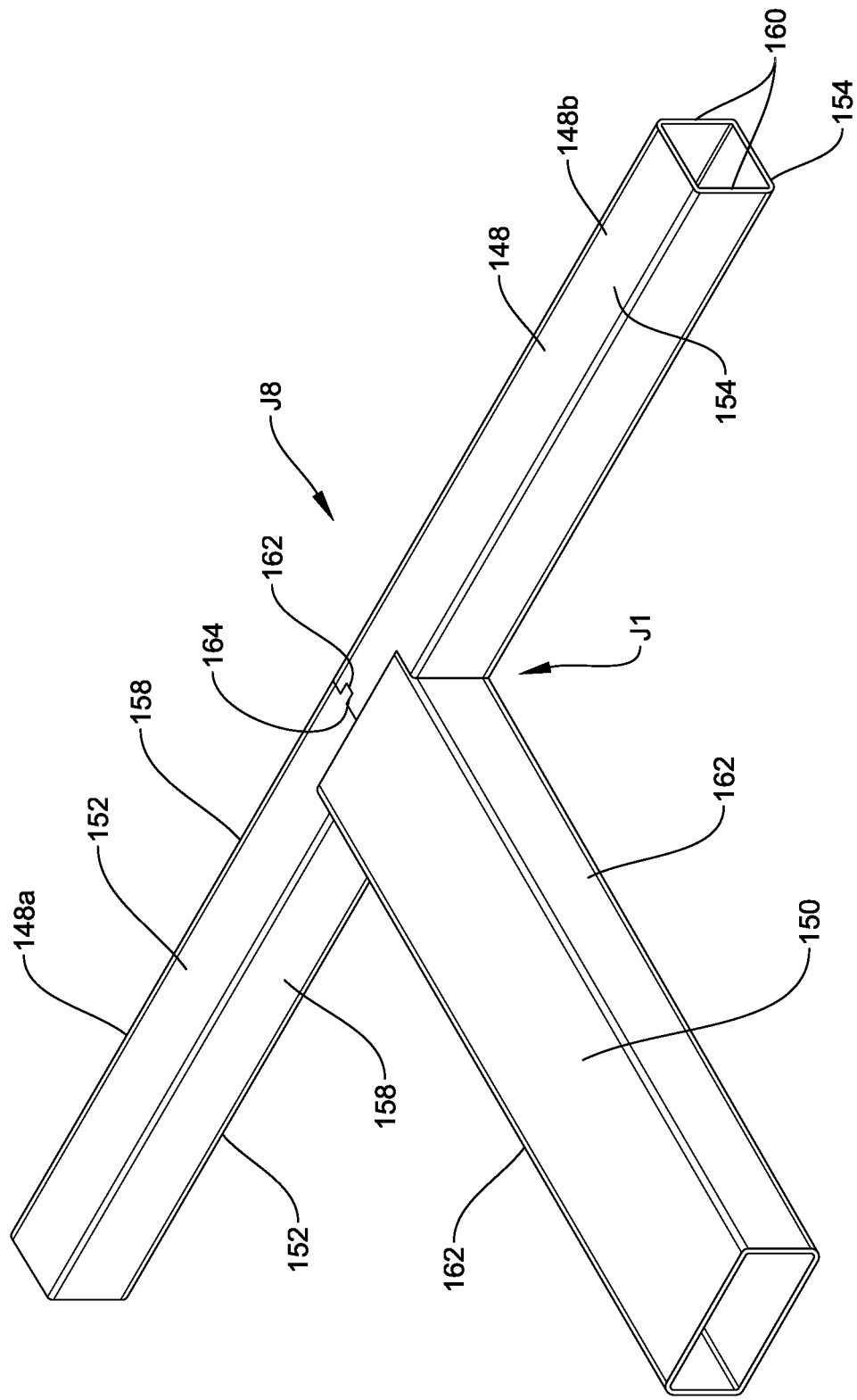
FIG. 20 is an enlarged fragmentary perspective view of another joint.
Figure 21:
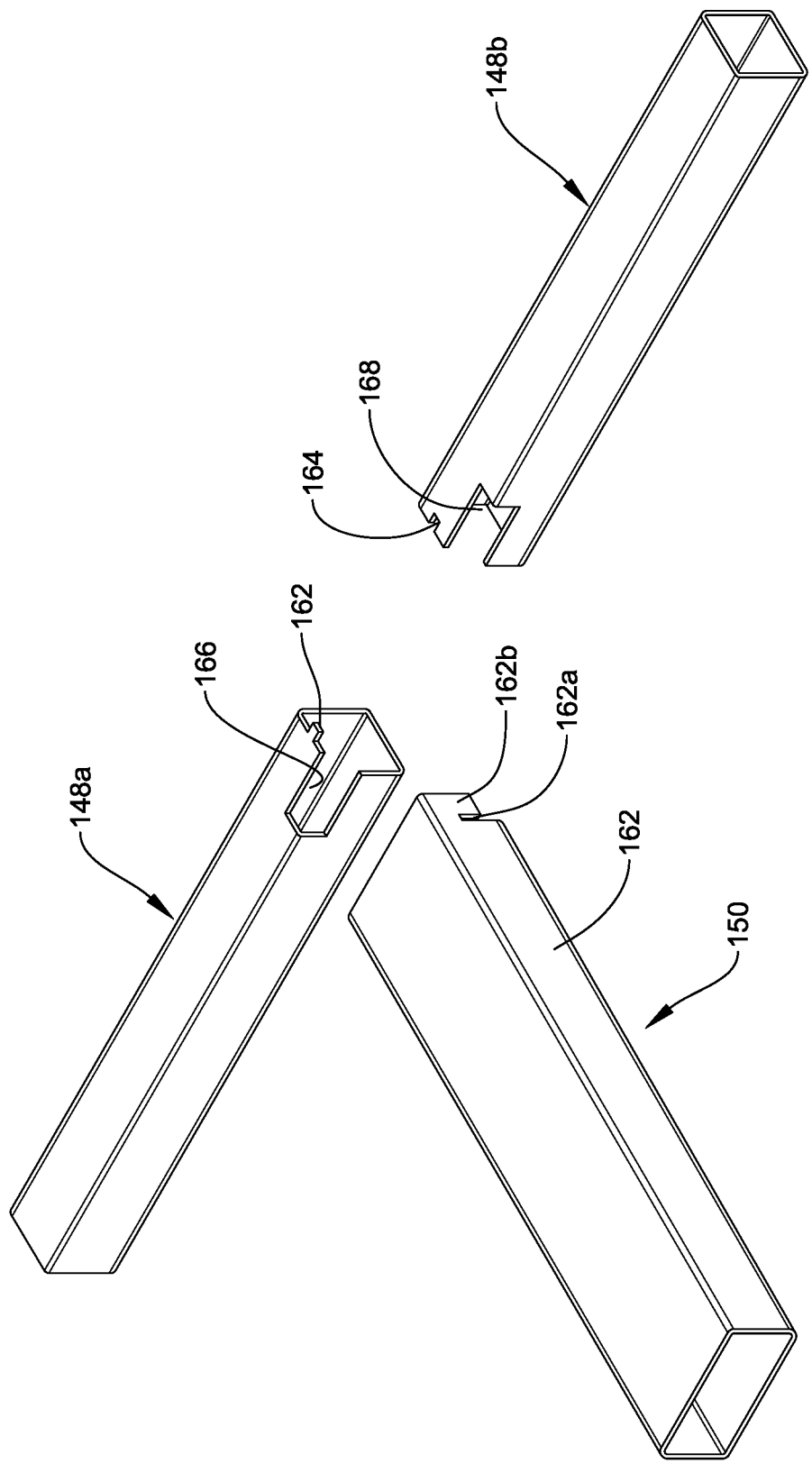
FIG. 21 is an exploded perspective view illustrating the joint of FIG. 20.

Referring to FIGS. 20 and 21, any one of the structural frame members may be formed as a composite structural frame member 148. For example, in the illustrated embodiment, composite structural frame member 148 may be formed from abutting first and second joined structural frame members 148a, 148b. Each of the first and second joined structural frame members 148a, 148b has an upper wall and a lower wall 152, 154, and a pair of opposed side walls 158, 160. First and second joined structural frame members 148a, 148b are joined by upper and lower tabs 162 formed in the upper and lower walls of one member, e.g. joined structural frame member 148a, which extend into corresponding notches 164 formed in the upper and lower walls of the other member, e.g. joined structural frame member 148b. The other structural frame member 150 abuts and straddles the side walls of both joined structural frame members 148a, 148b, which forms a joint similar to J1.

Referring to FIG. 21, structural frame member 150 includes slots 162a in its opposed side walls 162 that form tabs 162b that extend into a respective notch 166, 168 formed in each structural frame members 148a, 148b at their respective distal ends similar to notches 118, 120 described above.

It should be understood that the various joints described herein may be used with other structural frame members, such as structural frame members S, and further combined with other joints (see FIGS. 21A, 21B, 21C, 22 and 26). Further, the shape of the structural frame members may vary and include rectangular, as shown, or rounded cross-sections, including circular. Additionally, while illustrated with closed cross-sections, the structural frame members may have open cross-sections, such as structural angles, channels, half-angles, half tubes, or the like or composite shaped members, for example, with one portion having a closed cross-section and the other extending from the closed-cross-section, such as P-shaped member. Other structural member may have two closed hollow sections, such as side-by-side tubular members.

Figure 21A:
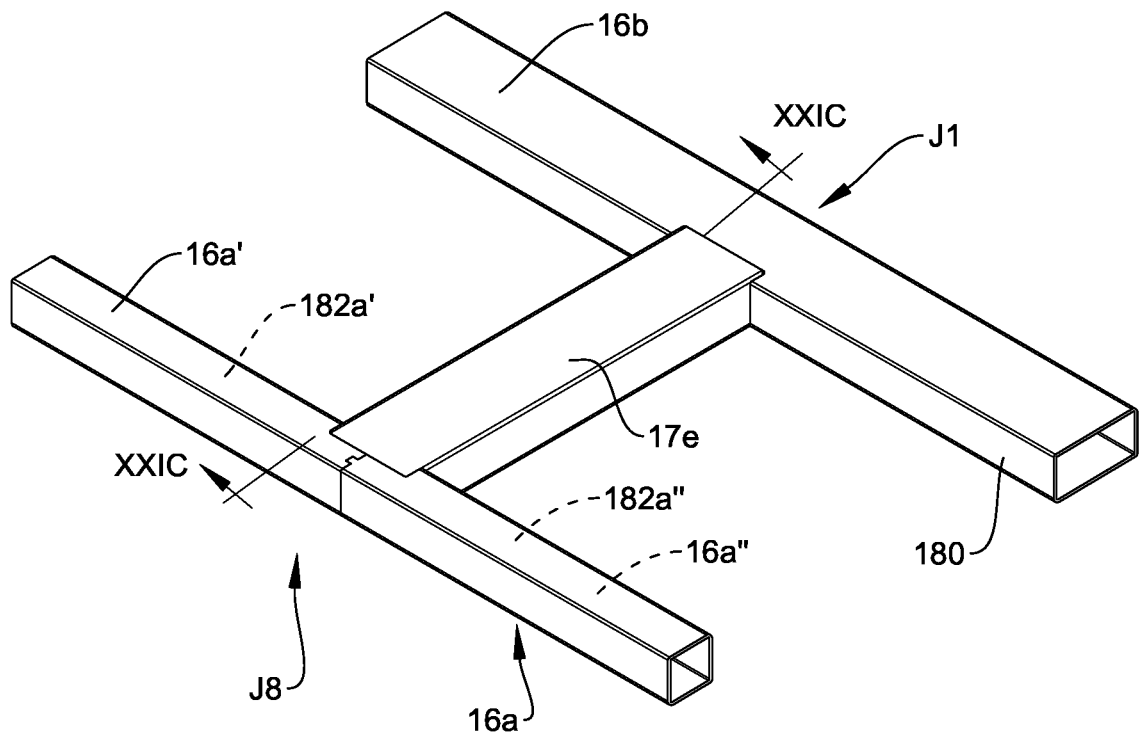
FIG. 21A is a similar view to FIG. 21 illustrating the opposed end of one of the structural frame members joined with a third structural frame member using a joint illustrated in FIGS. 6, 6A, and 7.
Figure 21B:
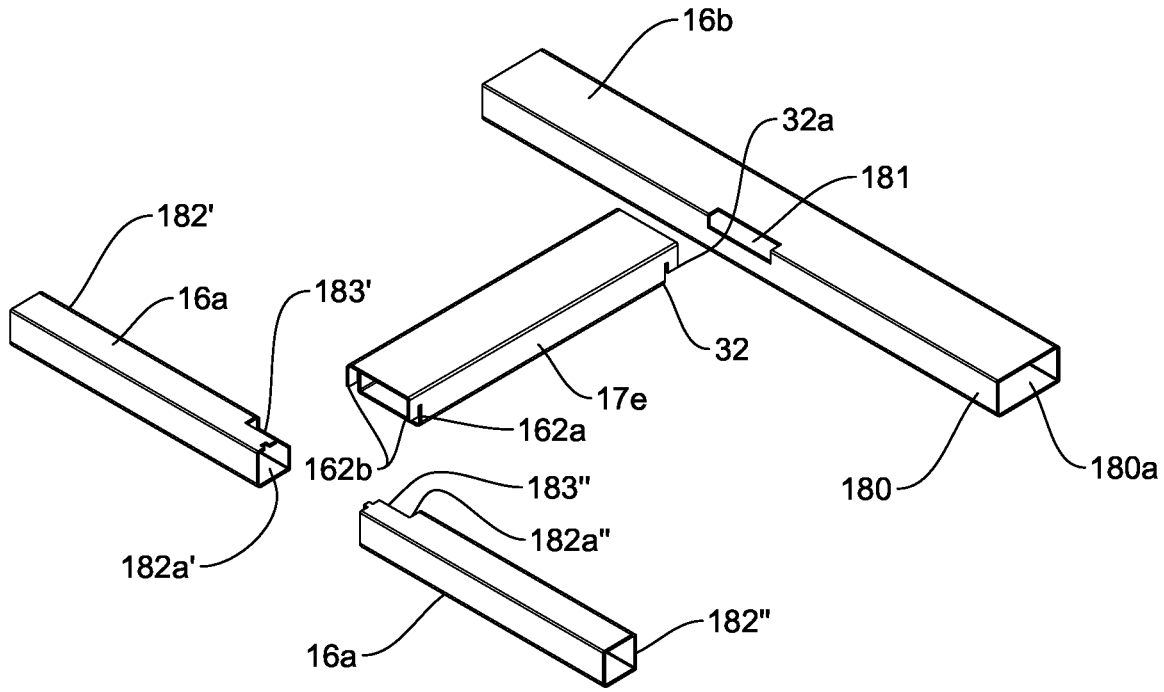
FIG. 21B is an exploded perspective view the structural frame members of FIG. 21A.
Figure 21C:
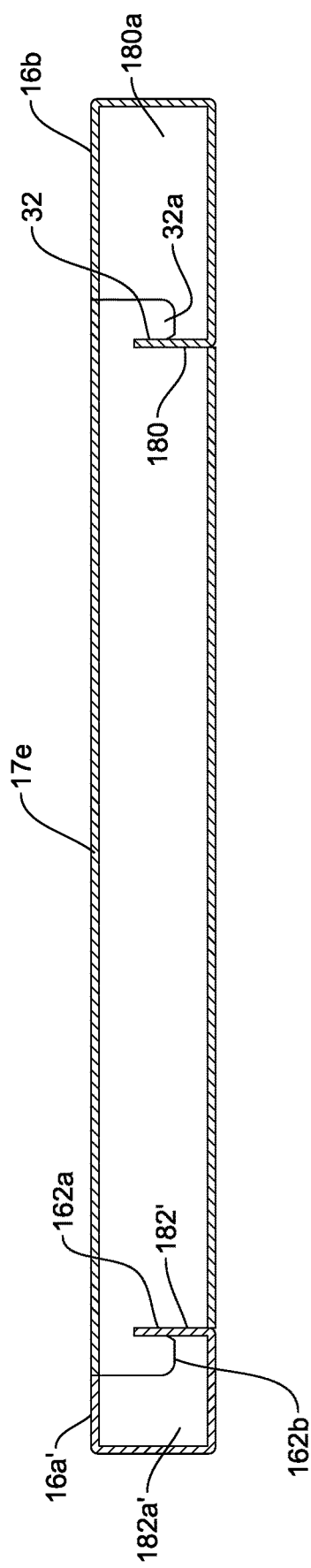
FIG. 21C is a cross-section view taken along line XXIC-XXIC of FIG. 21A.

Referring to FIGS. 21A, 21B, and 21C, as noted above multiple structural frame members may be assembled using two more joints, and further, as will be described below, the joints may be configured so that one joint may have a rigid connection, while another joint may have a flexible connection, for example, to relieve stresses in the overall frame.

For example, structural frame member 16b may be connected to structural frame member 17e using joint J1, with notches 32 receiving the side wall 180 of structural frame member 16b and tab 32a extended into the interior space 180a of structural frame member 16b through notch 181, similar to as described above in reference to FIGS. 6, 6A, and 7. Structural frame member 17e in turn may be connected to structural frame member 16a using joint J8, with notches 162a receiving the side walls 182, 182" of structural frame member 16a and tabs 162b extended into the interior spaces 182a', 182a" of structural frame members 16a', and 16a" through notches 183', 183", similar to as described above in reference to FIG. 21.

In the illustrated arrangement joint J8 may be a rigid joint, especially given that it is formed at the juncture of two abutting structural frame members 16a' and 16a" that are joined together in a similar manner to members 148a, 148b described below in reference to FIG. 20.

Joint J1 may be formed with greater tolerances between the mating tabs, notches, and/or side walls, as noted above, to provide some flexibility at the joint to thereby reduce stress in the frame. Further, as will be described more fully below, as with all the above joints, inserts may be located internally at one or both joints (J1 or J8) to reinforce the joint or joints or to introduced greater flexibility about one or more axes to modify the degrees of freedom at the respective joint.

Figure 22:
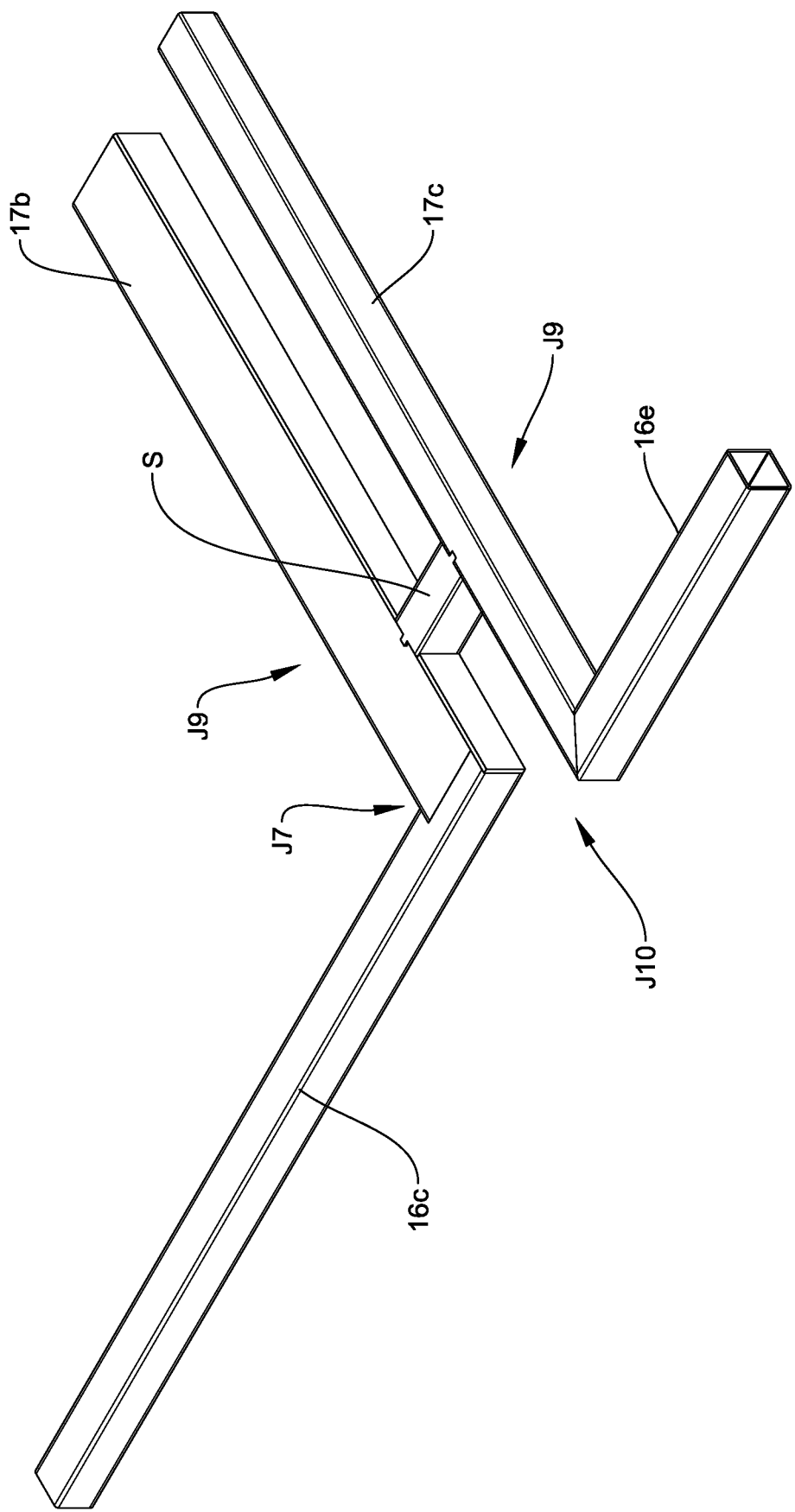
FIG. 22 is an enlarged fragmentary perspective view of another joint.
Figure 23:
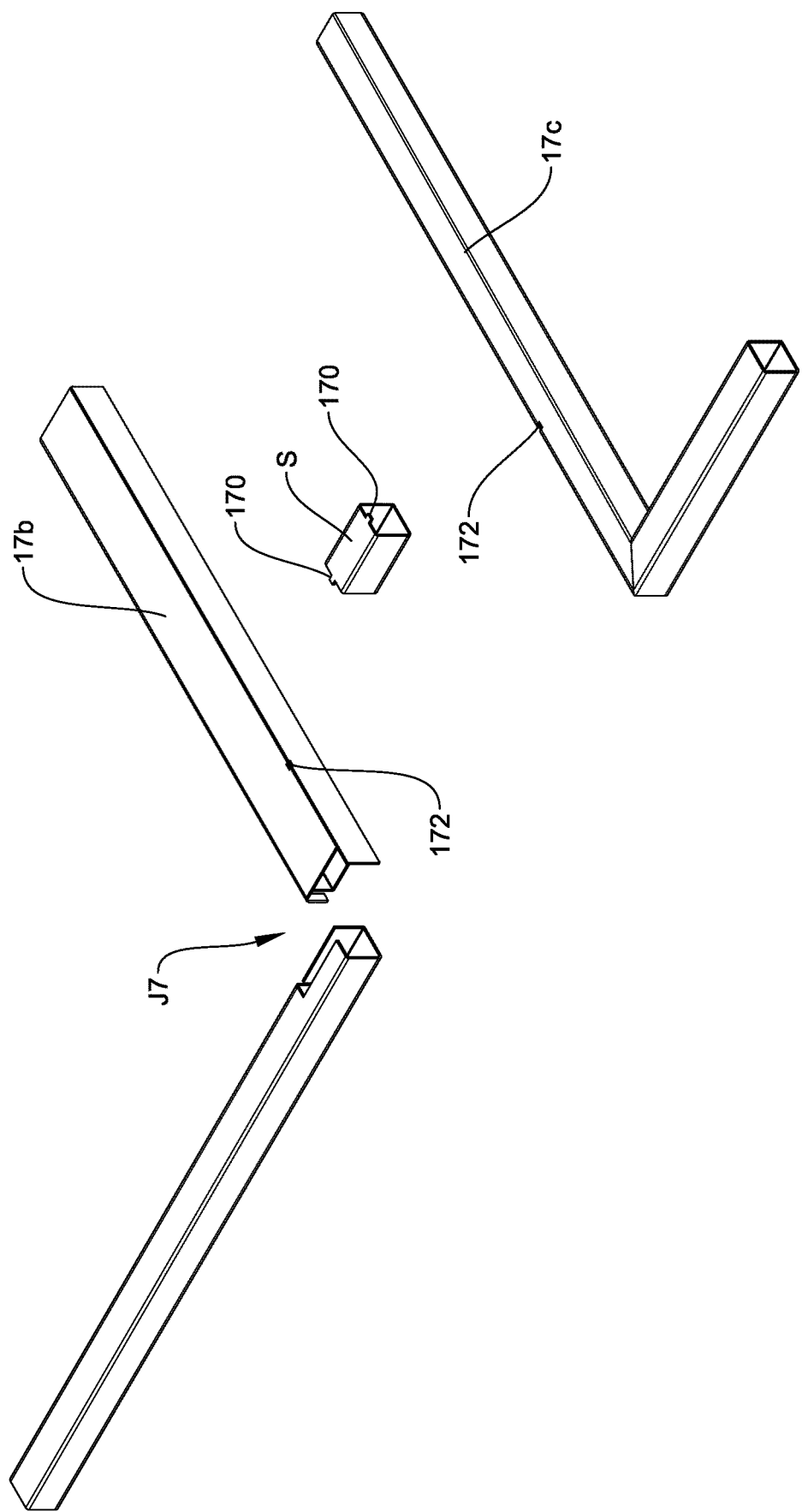
FIG. 23 is an exploded perspective view illustrating the joint of FIG. 22.

Referring to FIG. 22, joint J9 may be used to join a spacer structural frame member S with two other structural frame members, such as members 17b and 17c, with tabs 170 formed on the upper wall of spacer S and corresponding notches formed in the upper walls of members 17b, 17c.

Figure 24:
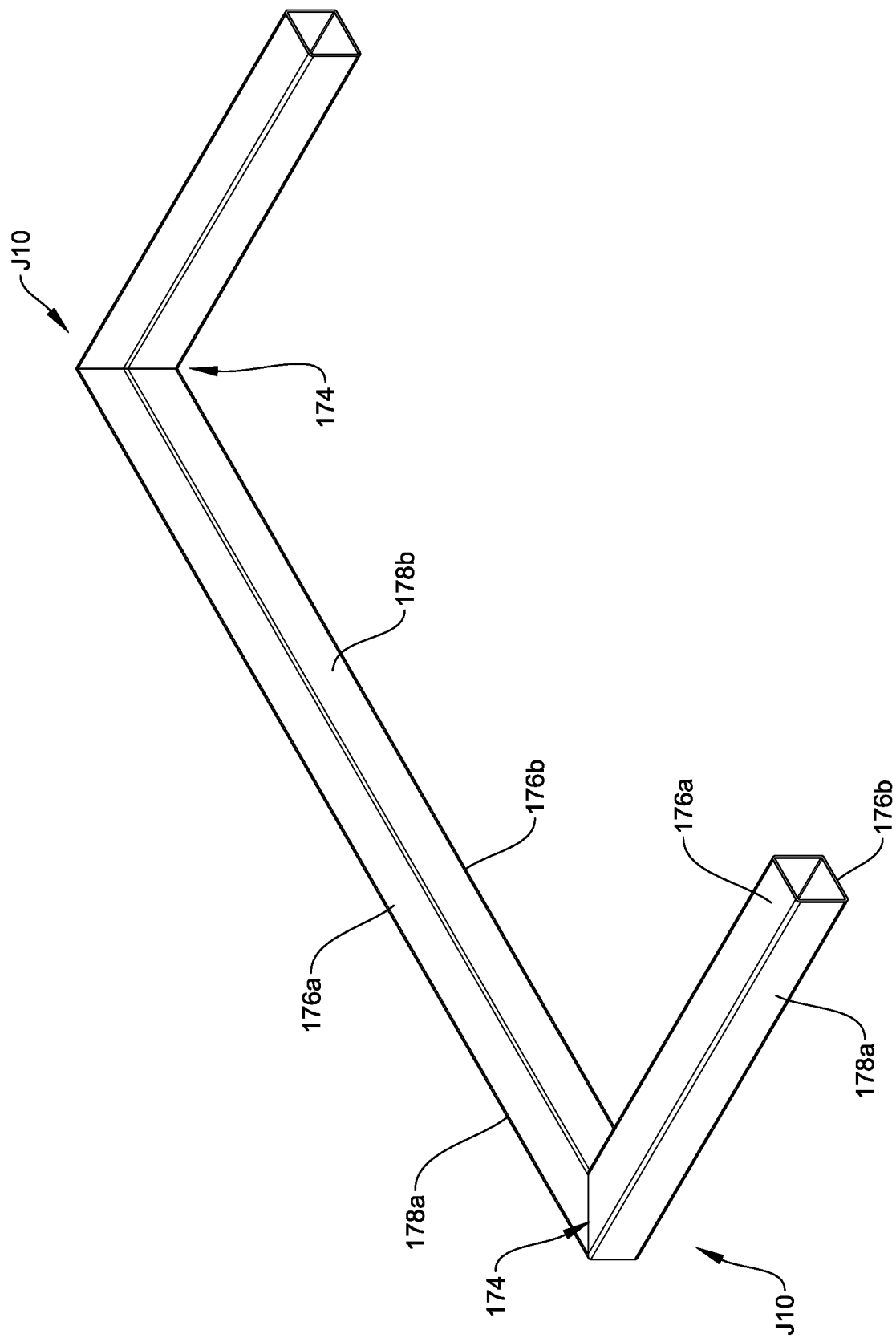
FIG. 24 is an enlarged fragmentary perspective view of another joint.
Figure 25:
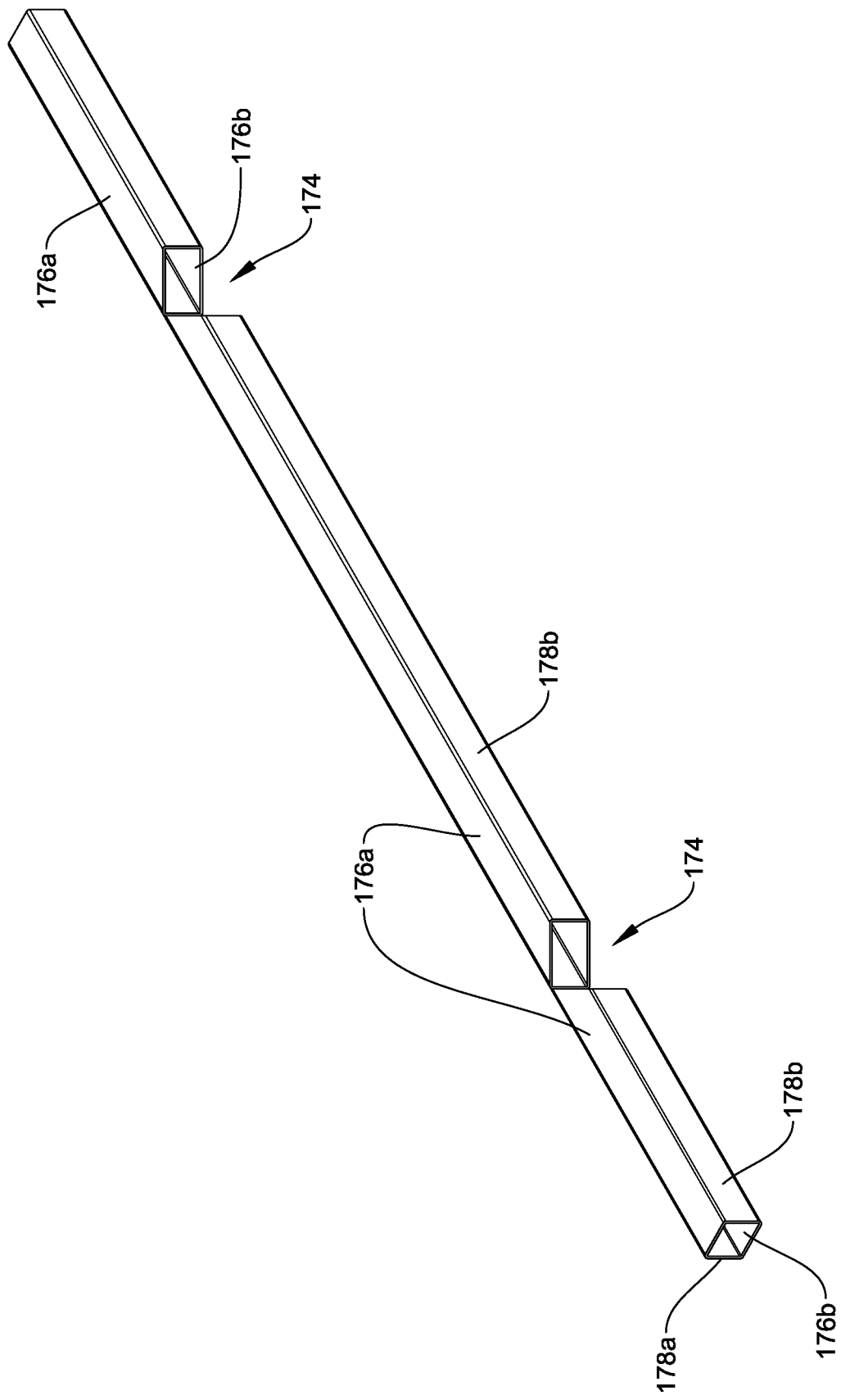
FIG. 25 is an unfolded perspective view illustrating the joint of FIG. 24.

Other joints, such as joints J10 shown in FIGS. 22, 24, and 25, may be formed by forming an angled notch 174, such as a 90 degree notch, in the upper, lower and side walls 176a, 176b, 178a, 178b of a structural frame member and then folding the structural frame member about the notch (or notches when multiple bends are desired) and, thereafter, welding the bent portions of the member together, such as best understood in FIGS. 24 and 25. For example, joints J10 may also be suitable for structural frame members 17c, 16d, 16e, 17f, and 17t or structural frame members 17i, 16g, and 16hc, which are used for framing a slide out or window.

Figure 26:
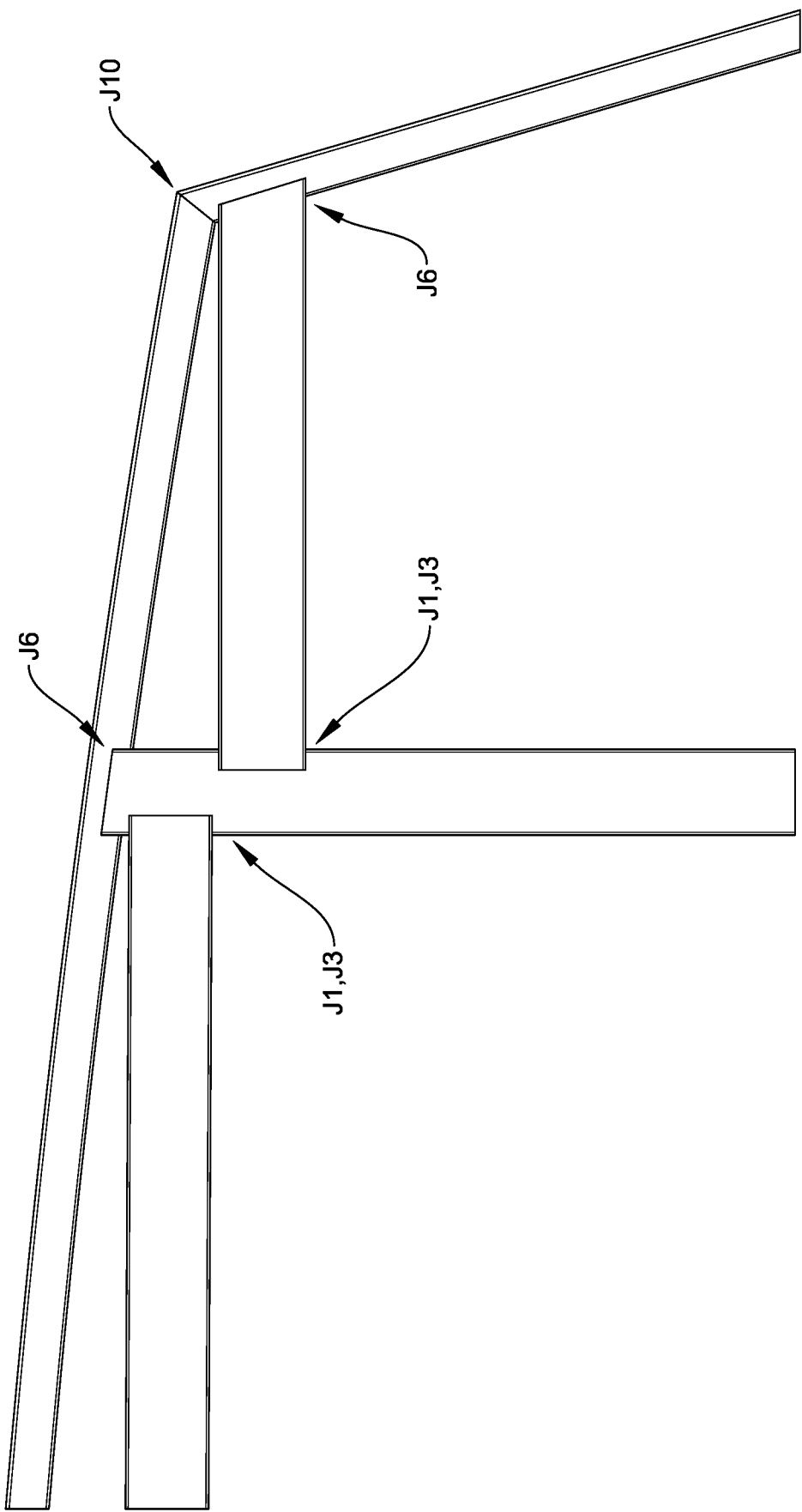
FIG. 26 is an enlarged fragmentary perspective view of another joint.
Figure 27:
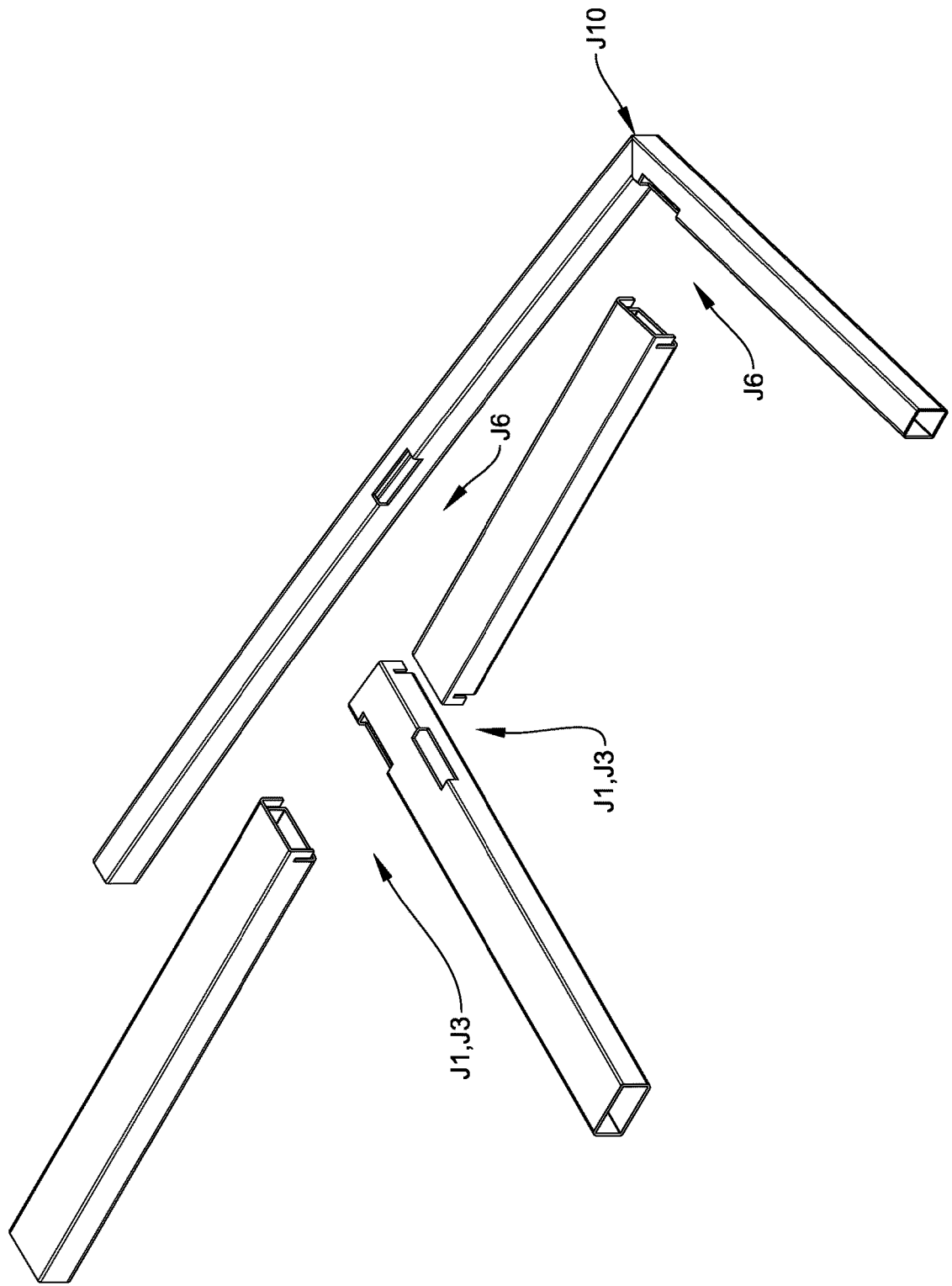
FIG. 27 is an exploded perspective view illustrating the joint of FIG. 26.

In any of the above, the structural assembly may further include an additional structural frame member or members joined with other structural frame members using any combination of joints, such joints J1, J3, J6, and/or J10, such as shown in FIGS. 26 and 27.

In any of the above, at least one weld may join the structural frame members together. For example, the side walls of the structural frame members may be joined together by a weld or welds or an adhesive, for example using a corner bead, including stitch corner beads (FIG. 7A). Optionally, the upper and lower sides of the structural frame members may be welded at their intersections. A full wrap around bead, such as full wrap around weld, may also be used. Further, to adhere the laminations described below, adhesive may be applied to the upper and lower walls of the respective structural frame members (see FIG. 7B). However, the weld or welds may be omitted completely and, instead, rely on the external laminations L (shown only partially in FIG. 2) for strength, which are secured to the frame by adhesive, such as described in U.S. patent application Ser. No. 16/346,716, filed on Mar. 18, 2019, owned by Jayco, which is incorporated by reference herein its entirety.

Referring to FIGS. 28-34, in another embodiment of the various joints described herein, an insert or inserts maybe provided internally to the joint to reinforced the joint internally and, optionally, replace any exterior welds. Further, the joints may be tailored to customize the rigidity or flexibility of the joint as desired, for example to increase or decrease the rigidity or flexibility of the joint about one or more axes. Although illustrated in reference to only some of the joints, it should be understood that any or all of the joints disclosed herein may incorporate the insert described below.

Figure 28:
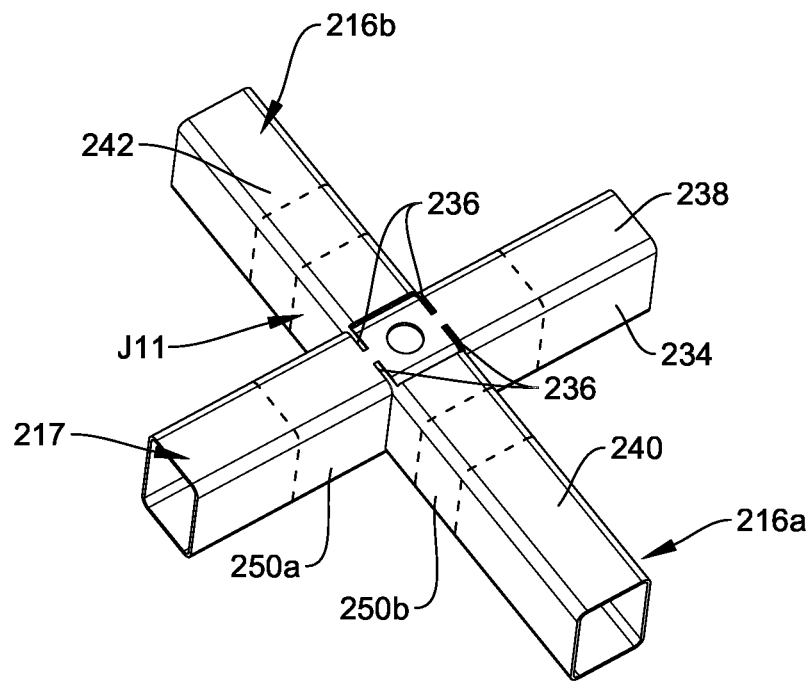
FIG. 28 is a perspective view illustrating another joint with one or more injection ports.
Figure 29:
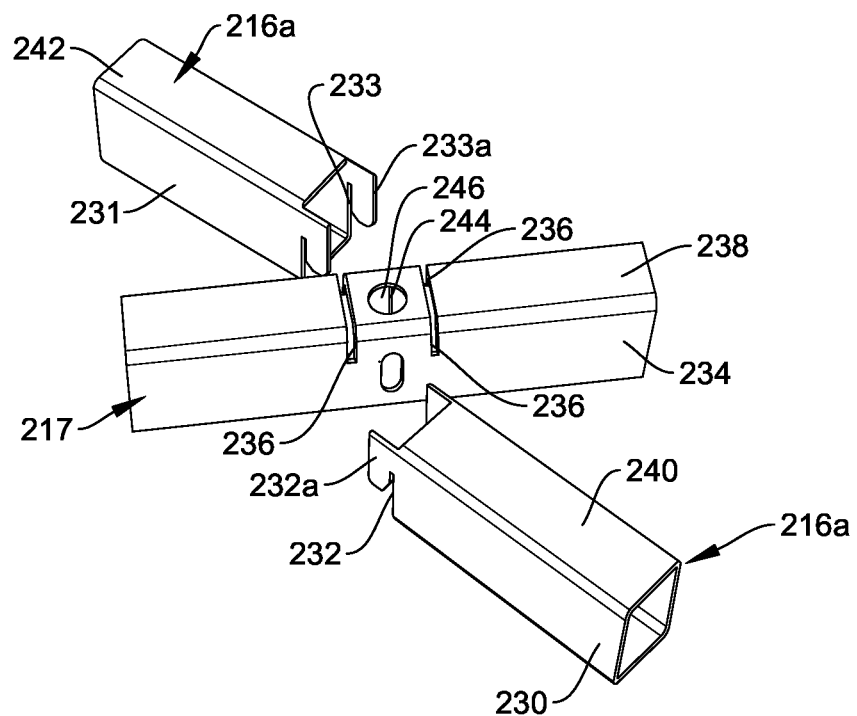
FIG. 29 is an exploded perspective view of the joint of FIG. 28.
Figure 30:
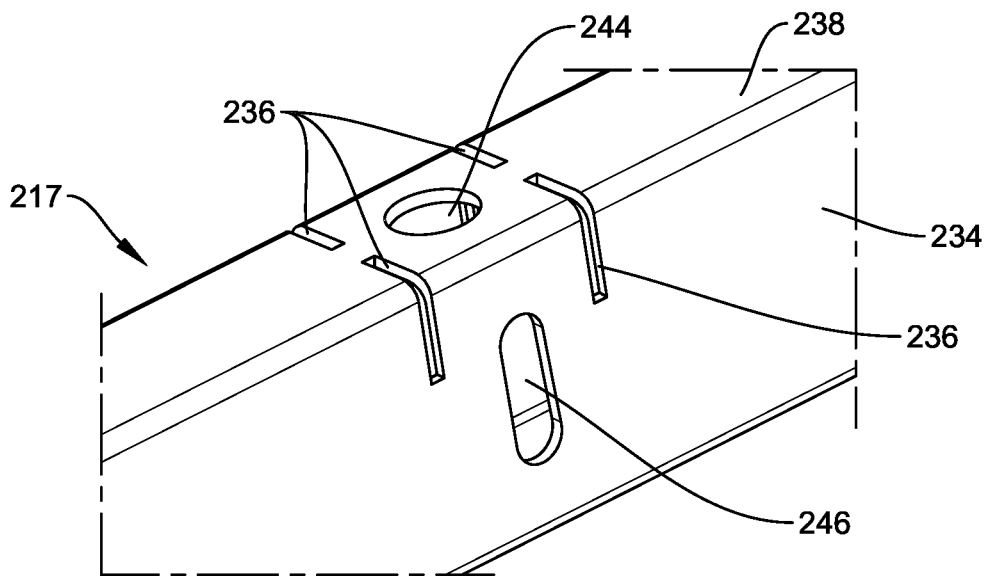
FIG. 30 is an enlarged fragmentary perspective view of one of the structural frame members of the joint of FIG. 28.
Figure 31:
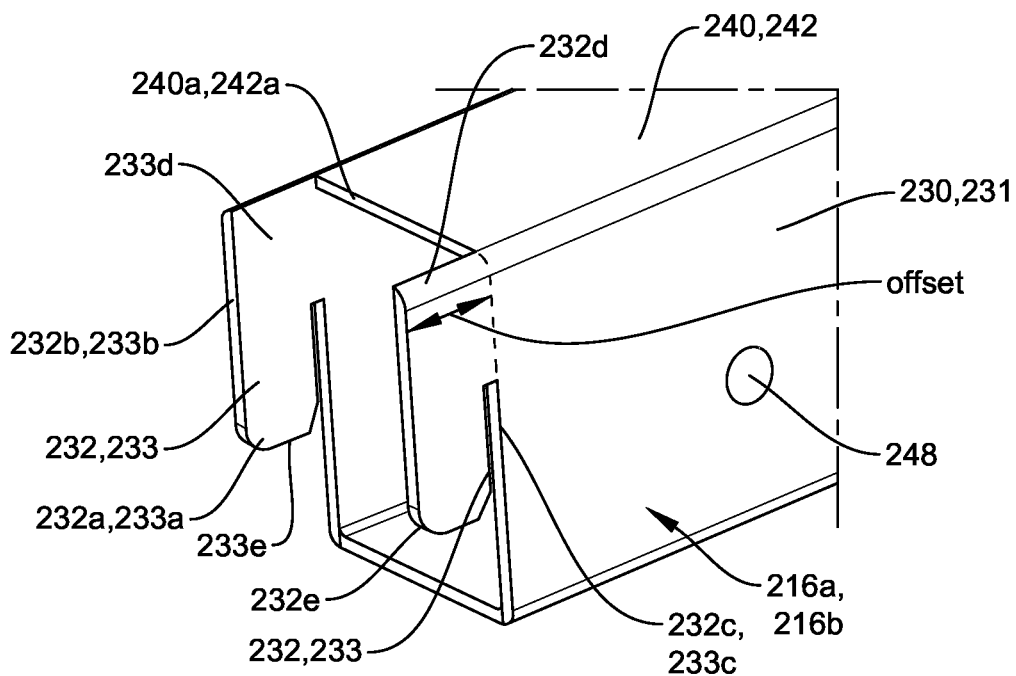
FIG. 31 is an enlarged fragmentary perspective view of another structural frame member of the joint of FIG. 28.

As best seen in FIGS. 28 and 29, an exemplary joint J11, which is similar to joint J2, includes a three structural frame members 217, 216a, and 216b, with structural frame members 216a and 216b mounted to structural frame member 217 on opposed sides of structural frame member 217. In the illustrated embodiment, structural frame members 216a and 216b are mounted to structural frame member 217 on opposed sides of structural frame member 217 at ninety degree angles (orthogonal) to form a cross-shaped joint. However, it should be understood that the structural frame members 216a and 216b may be mounted to structural frame member 217 at non-orthogonal angles, such as shown in joint J6 (FIG. 16).

Similar to joint J2, each of structural frame members 216a and 216b is coupled to and engaged with a respective side wall 234 of the opposed sidewalls 234 of structural frame member 217 by a pair of tabs 232a, 233b. Tabs 232a, 233a are formed by slots 232 and 233 that extend up and into side walls 230 and 231 of the respective structural frame members 216a, 216b. Similar to the previous embodiments, in the illustrated embodiment tabs 232a, 233a have a shorter height than the remainder of the side walls 230, 231, which helps facilitate installation, though they may have the same height as the respective side walls.

Tabs 232a, 233a extend into the hollow space inside structural frame member 217 through corresponding pairs of notches 236 formed in structural frame member 217 (on opposed side walls 234) to form a mechanical internal interface with the side walls 234 of structural frame member 217. The size of the notches and slots may vary. For example, in the illustrated embodiment, notches 236 may be sized to be approximately the same thickness as the sidewalls 230, 231 of structural frame number 216a, 216b (and the slots 232, 233 may be sized to be approximately the same size as the wall thickness of structural frame member 217) to form a snug fit between the structural frame members so that they optionally form a tight, rigid connection. Further, the terminal edges 240a, 242a (FIG. 31) of the respective upper walls 240, 242 of structural frame members 216a, 216b may be offset from the terminal edges 232b, 233b of tabs 232a, 233a so that they align with the inner edge 232c, 233c of slots 232, 233 and, therefore, abut the side walls 234 of structural frame member 217 at upper wall 238. In this manner, the upper walls 240, 242 of structural frame members 216a, 216b are generally coplanar with, but adjacent the upper wall 238 of structural frame number 217.

As noted, structural frame members 216a, 216b may form a tight fit connection with structural frame member 217. Alternately, the notches and slots may be sized to allow for some flexibility at one or more selected joints to reduce stresses on the frame. As noted above, some of the panels, for example, the panels that form the side walls, floors, and roof in a recreational vehicle tend to be subject to repeated dynamic loading. Hence, it may be beneficial to make the panel more flexible in areas of the frame that are subjected to increased stress from dynamic loading.

For example, to introduce some flexibility, the clearance between the notch and the side wall of structural frame member 216a or 216b (and between the slot and the side wall of structural frame member 217) may be increased (from the above stated exemplary ranges of about 0 to 0.006 inches, 0 to 0.02 inches, or 0 to 0.04 inches) to provide more than an air gap, for example, a gap in a range of $1/64^{th}$ to $1/32^{th}$ of an inch, in a range of $1/64^{th}$ to $1/16^{th}$ of an inch, or in a range of $1/64^{th}$ to $1/8^{th}$ of an inch to provide the desired flexibility and/or to allow the foam, described below, to flow in the gap or gaps to provide some controlled flexibility at the joint. Alternately, the gaps may be provided to ease installation and allow the foam insert described below to flow and, depending on the foam formulation, form an adhesive bond between the structural frame members, as a well as form bearing members (or in some cases springs) to control the rigidity or flexibility of the joint.

Referring to again FIGS. 28 and 29, one or more expanding foams may be injected into the space formed in one or more of the structural frame members at the joint to internally reinforce the interlock between the joined structural frame members. For example, one of structural frame members, such as structural frame member 217, optionally includes at least one injection port 244 (FIG. 29) for injecting one or more expanding foams into the space adjacent the interlocked sections of the structural frame members. For example, a suitable foam may become rigid when cured or may cure or set to a compressible or flexible state to provide a more flexible joint. Optionally, as noted above, the foam may be formulated to provide an adhesive bond between the foam and the structural frame members. Further, a portion of the joint may have one foam injected, and another portion of the joint may have another foam injected so that the stiffness of the joint and other components mounted thereto may be varied.

Figure 32:
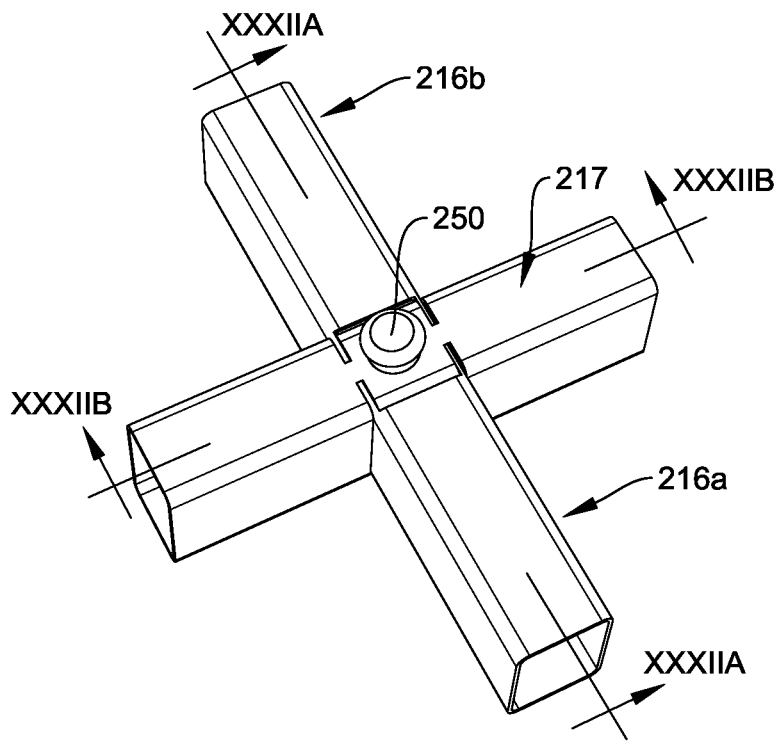
FIG. 32 is a similar view to FIG. 28 illustrating the joint reinforced with a foam material.
Figure 33:
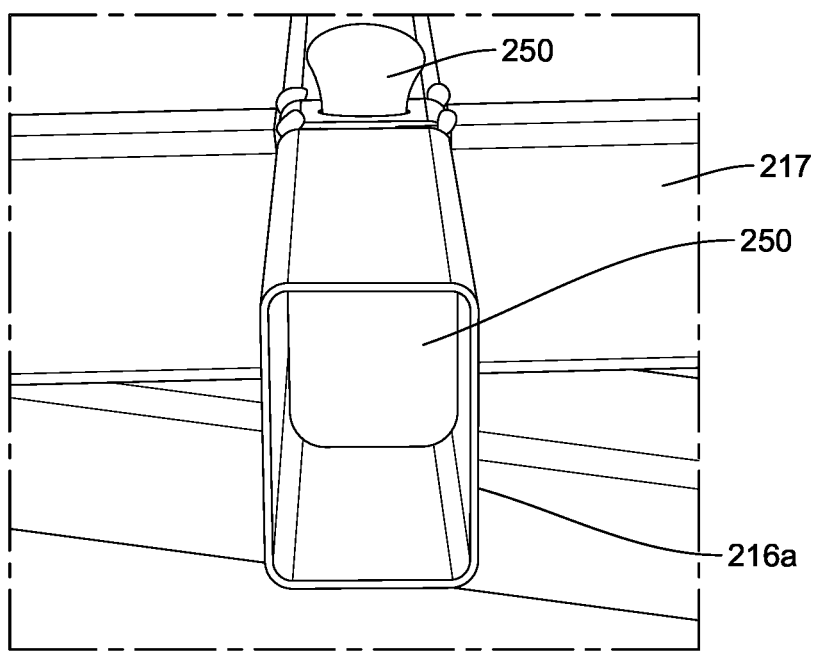
FIG. 33 is an end perspective view of the joint of FIG. 32.
Figure 32A:
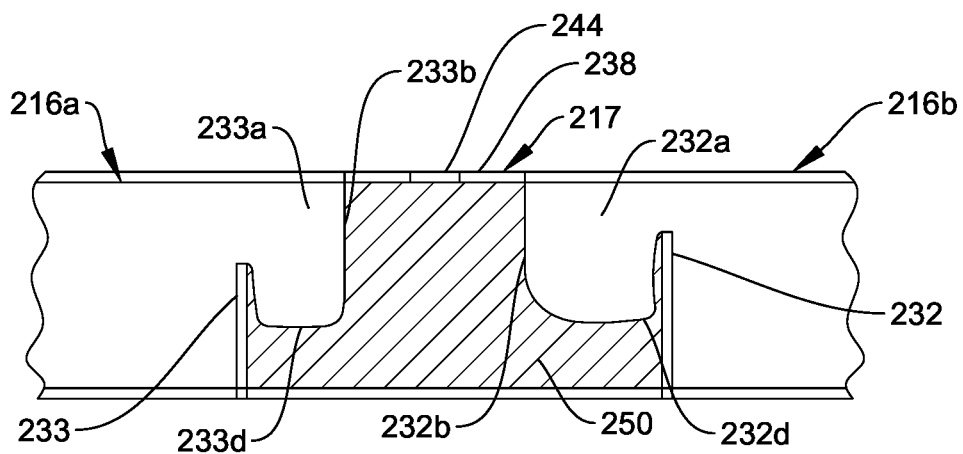
FIG. 32A is a cross-section taken through line XXXIIA-XXXIIA of FIG. 32.
Figure 32B:
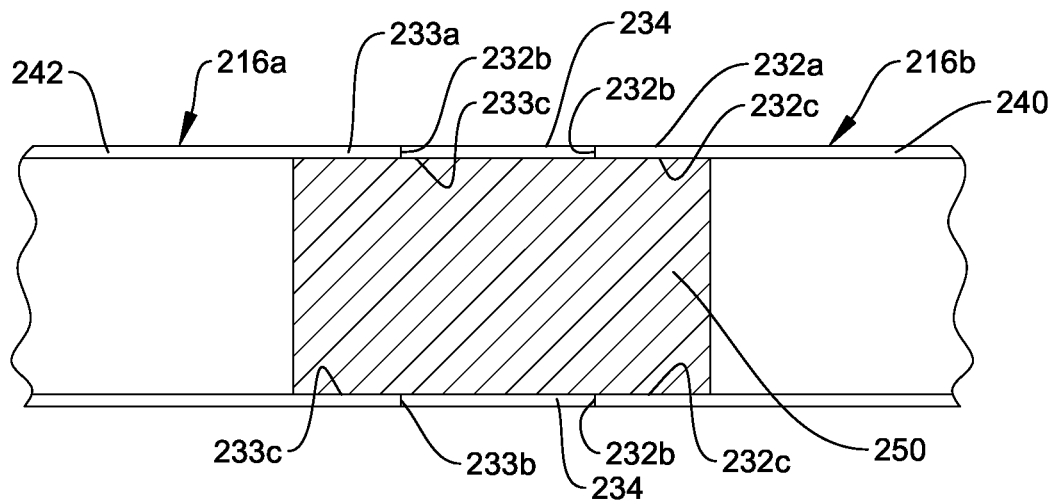
FIG. 32B is a cross-section taken through line XXXIIB-XXXIIB of FIG. 32.

Referring to FIGS. 32A and 32B, when foam is injected into the hollow space in the structural frame member (e.g. structural frame member 217), for example, through an injection port 231, between tabs 232a, 233a, depending on the size of the tabs, the foam may flow between the distal vertical edges 232b and 233b of the tabs (FIG. 32A), and further between the inwardly facing sides 232c, 233c of tabs 232a, 233a (FIG. 32B). Again depending on the height of the tabs, the foam may flow between the lower distal edges 232d and 233d of the tabs 232a, 233a (FIG. 32B) and the bottom wall of the structural frame member. In this manner, when the foam expands, the foam can form a bearing member that provides restraint in X, Y, and Z axes as shown in FIGS. 32A and 32B. Depending on the foam, the bearing member may be rigid or may be compressible with a varying spring force, again depending on the formulation. When formed from a compressible foam, therefore, the bearing member may also form a spring or springs along the X, Y, and/or Z axis.

Additionally, as noted above depending on the formulation, the foam may form an adhesive bond with the tabs and/or side walls, with the adhesive bond being enhanced depending on the material forming the structural frame members. For example, in polymer based structural frame members a greater bond may be achieved than with aluminum structural frame members, again depending on the formulation of the foam.

Figure 32C:
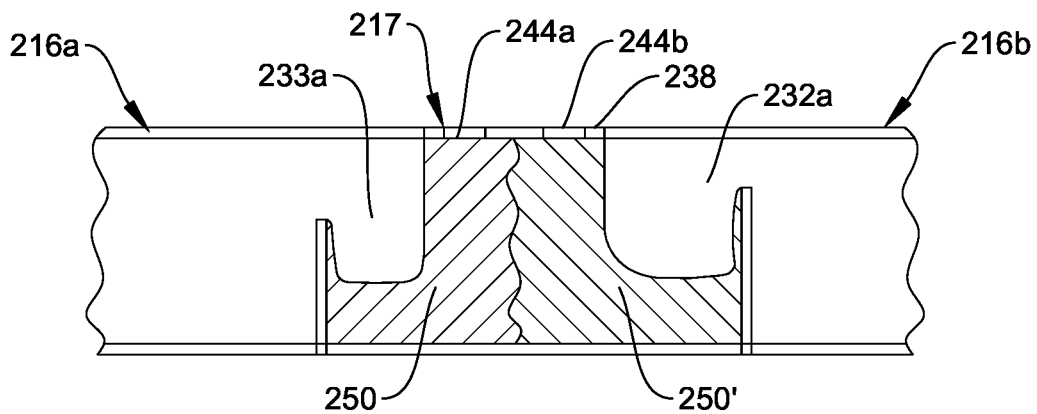
FIG. 32C is a similar cross-section to FIG. 32A but illustrating another embodiment of the foam inserts.
Figure 34:
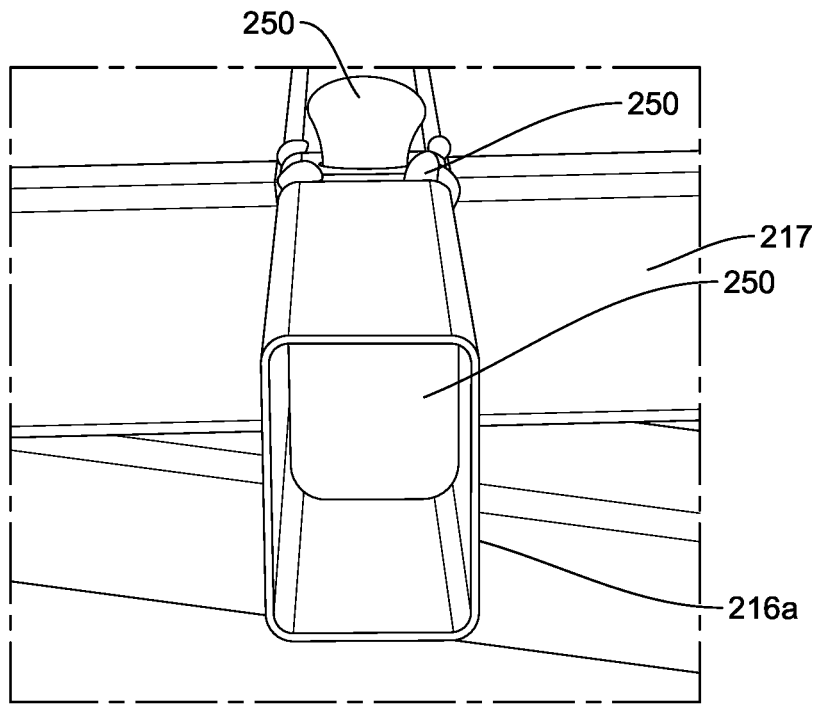
FIG. 34 is similar view to FIG. 33.

As best seen in FIG. 32C, a joint may have two side by side injections ports for injecting two different foams. Referring to FIG. 32C, when foam is injected into the hollow space in the structural frame member (e.g. structural frame member 217 and into joints similar to J1 and J2 except with narrower notches) it may be injected through two ports, e.g. ports 244a and 244b, which are provided in the upper wall 238 and between tabs 232a, 233a, so that the foams flow into the hollow space between tabs 232a and 233a and can form foam inserts 250 and 250' with different properties. In this manner, when the foams expand, foam insert 250 can form a bearing member that provides restraint in X, Y, and/or Z axes for tab 233a, while foam insert 250' can form a bearing member that provides restraint in X, Y, and/or Z axes for tab 232a as shown in FIG. 32C. For example, one foam may form a rigid insert, while the other may form a flexible, resilient insert.

Additionally, as noted above depending on the formulation, the foam may form an adhesive bond with the tabs and/or side walls, with the adhesive bond being enhanced depending on the material forming the structural frame members. For example, in polymer based structural frame members a greater bond may be achieved than with aluminum structural frame members, again depending on the formulation of the foam.

Suitable foams may include foams from Alumilite of Kalamazoo, Mich. or foams from Smooth-On of Macungie, Pa. For example, suitable foams include ALUMIFOAM, which is a rigid expanding urethane foam; FLEX URETHANE, which is an expanding flexible urethane foam; FOAM IT! RIGID, which is a rigid expanding urethane foam; and SOMA FOAMA, which is an expanding flexible silicone foam.

Referring again to FIGS. 28 and 29, injection port 244 may be located in upper wall 238 of structural frame member 217 between notches 236 so that port 244 can direct foam 250 into the hollow space in structural frame member 217 between tabs 232a and between tabs 233a and side walls 234. Further, depending on the depths and heights of the respective tabs, the foam 250 may flow between the vertical edges 232b, 233b of tabs 232a and 233a to form a bearing member (when cured or set) between the respective tabs 232a and 233a, and also under each lower edge of the tabs.

As best seen in FIG. 32A, in one embodiment, as noted above, the depth and height of each of the tabs allows the foam 250 to flow between the inwardly facing vertical edges 232b, 233b of tabs 232 and 233 as well as between the inwardly facing sides 232d, 233d and beneath the lower edges 232e, 233e of each tab 232, 233. Additionally, as noted above, depending on the size of the clearance or gaps between the respective structural frame members, and the viscosity of the foam, the foam 250 may flow up through the upper wall 238 of structural frame member 217 adjacent upper walls 240, 242 of the structural frame members 216a, 216b, such as shown in FIG. 32.

Referring again to FIG. 29, structural frame member 217 may include additional injection ports, for example, that direct the flow of foam into adjacent structural frame members or allow two different foams to be injected. For example, structural frame member 217 may have injection ports 246 provided in one or each of the opposed sidewalls 234, between notches 236 and between tabs 232a and 233a, to direct the flow of foam 250 into the hollow space provided in structural frame members 216a and 216b adjacent side walls 234 of structural frame members 217.

In the illustrated embodiment, each of the structural frame members 217, 216a and 216b is a hollow tubular member so that the space provided in each structural frame member is defined by and bounded by their respective upper walls, side walls, and bottom walls. It should be understood that solid or at least partially hollow members may be used to form the respective structural frame members as well.

In this manner, when the foam cures, the internal interface between the tabs and the side walls and bottom wall, for example, is joined either with a connection formed by the foam forming a bearing member adjacent the tabs. For example, when using foam that cures into a rigid form the connection forms a rigid bearing member. When the foam forms a compressible or flexible bearing member adjacent the tabs, the bearing member is flexible and further can have spring properties when the cured or set foam exhibits elastic properties. Additionally, as noted above, one joint (e.g. between structural frame member 216a and structural frame member 217) may include a rigid foam (when cured) and other the other joint (e.g. between structural frame member 216b and structural frame member 217) may include a compressible or flexible foam. The location of the differing foams may be controlled in a manner to allow the rigidity or flexibility of the frame to be customized.

Figure 35:
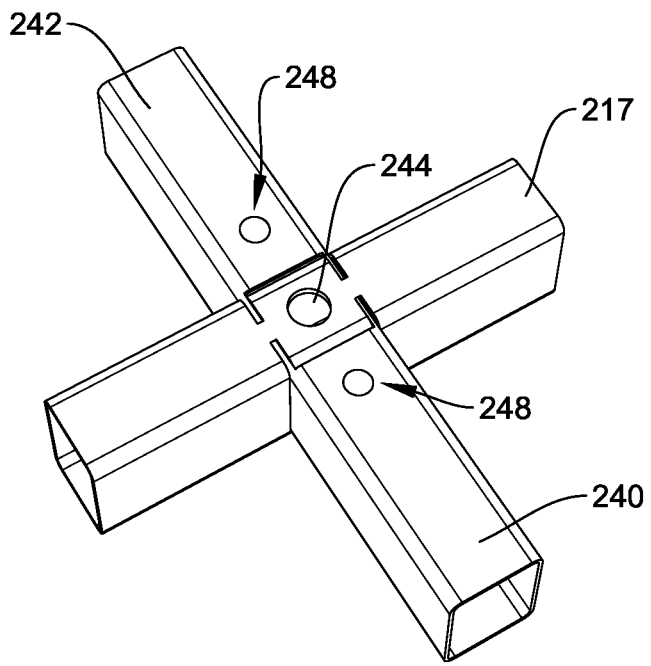
FIG. 35 is a perspective view illustrating another joint similar to the joint illustrated in FIG. 28 with multiple injection ports.

For example in one embodiment, the space in structural frame member 217 may be filled with a foam 250a (FIG. 28) that retains some flexibility or compressibility after it cures to allow the structural frame members 216a, 216b to flex about structural frame member 217. In contrast, the space in structural frame members 216a, 216b may be filled (for example, via injection ports 248 (FIG. 31)) with a foam 250b (FIG. 28) that becomes rigid upon curing so that when other components are mounted to one or both the structural frame members 216a or 216b, the foam can provide rigidity to each connection. For example, ports 248 (see FIGS. 31 and 35) may be provided in one or both side walls or upper wall of the respective structural frame members 216a, 216b.

Figure 36:
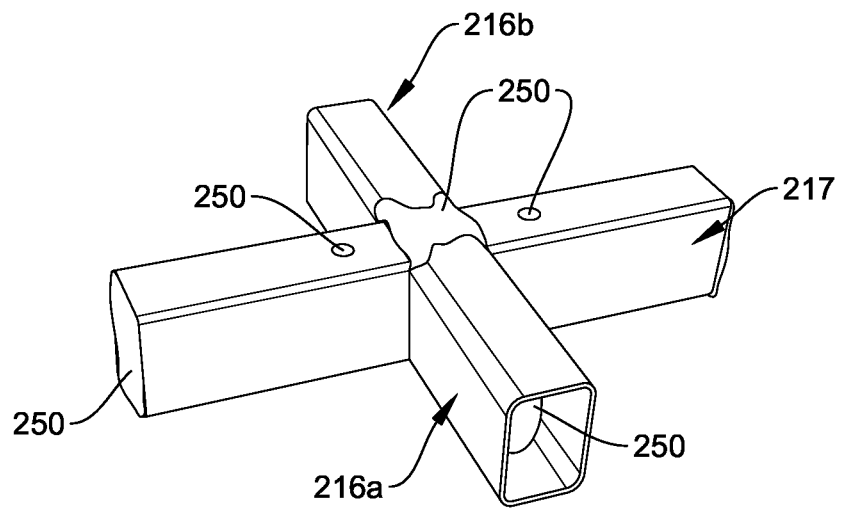
FIG. 36 is an end perspective view of the joint of FIG. 35 illustrating one or more foam inserts injected into the joint of FIG. 35.

In another embodiment, foam 250 may be injected through all the accessible injection ports, such as shown in FIG. 36, which when cures becomes rigid. Foam 250, therefore not only internally couples the tabs of structural frame members 216a, 216b to the interior of structural frame member 217, but also internally couples structural frame members 216a, 216b to the exterior of structural frame member 217 to form a very rigid joint. This may be further enhanced if the foam is formulated with adhesive properties.

Figure 37:
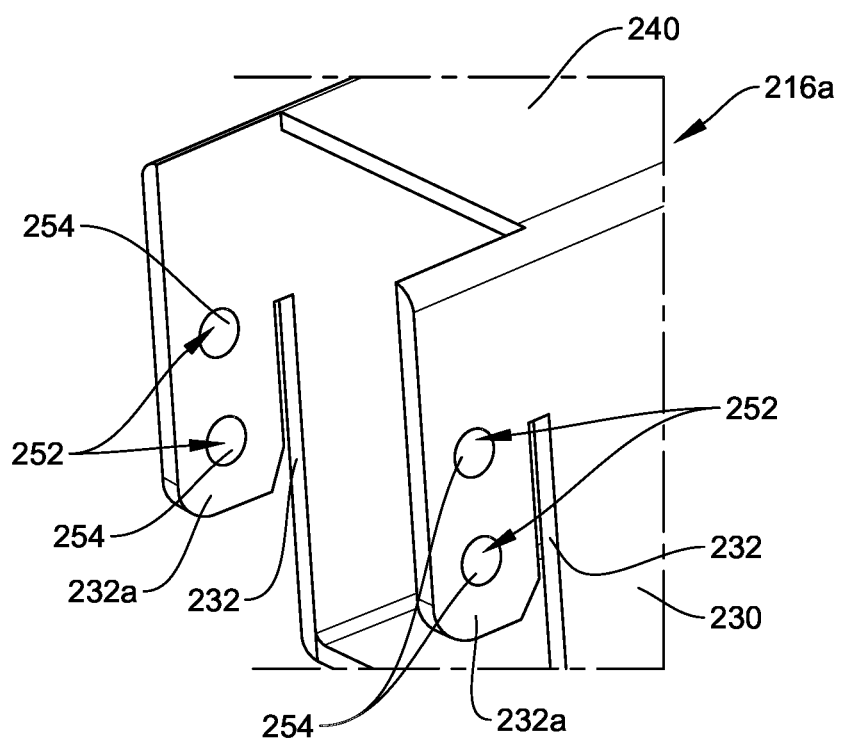
FIG. 37 is an enlarged fragmentary perspective view of another embodiment of the end of one the structural frame members of the joint of FIG. 35.

Optionally, to further enhance the mechanical coupling of the structural frame members together, one or both tabs 232a, 233a may include recesses 252 to enhance the mechanical coupling of the foam to the tabs 232a, 233a and, hence, to the structural frame members 216a, 216b. For example referring to FIG. 37, recess 252 may be formed in tabs 232a, 233a inward of their outer perimeters by transverse through holes or circular indentations 254 formed in the respective tabs.

Figure 38:
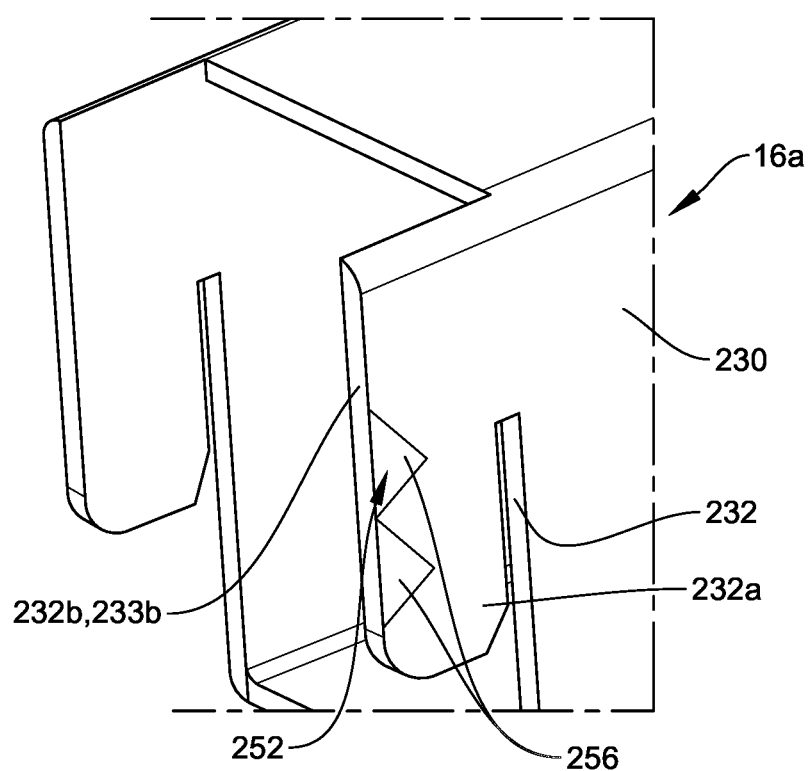
FIG. 38 is an enlarged fragmentary perspective view of yet another embodiment of the end of one the structural frame members of the joint of FIG. 35.

Alternately, recesses 252 may be formed along the distal edges 232b, 233b of one or both of the tabs 232a, 233a in the form of cutouts or notches 256 (FIG. 38). Again in this manner, the foam will flow into the respective recesses to mechanically couple the foam to the tabs 232a, 233a and, hence, structural frame members 216a, 216b.

Figure 39:
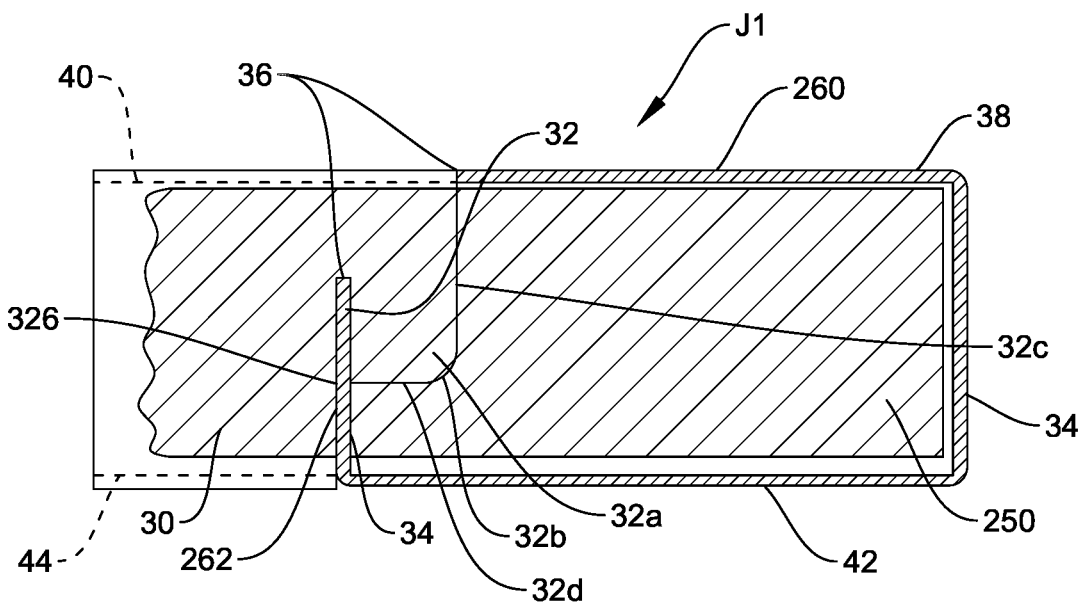
FIG. 39 is a cross-section view similar to FIG. 6 illustrating the joint with an insert.

As noted above, any of the above-described joints may be enhanced or modified by the addition of a foam insert or inserts. For example, referring to FIG. 39, joint J1 (or joint J2) may include an injection port 260 in its upper wall 38 between its opposed ends of notch 36 (and hence between tabs 32a) to inject a foam insert 250, which can at least partial fill the hollow space between tabs 32 and adjacent tabs 32a to extend between their distal vertical free edges 32c and the opposed side wall 34 of structural frame member 17h. Further, the foam may flow under distal bottom free edges 32d and extend between edges 32d and bottom wall 42. In this manner, the foam forms a bearing member to provide reactive forces on tabs 32a in the X, Y, and Z axes. As noted above, these may be spring forces if the foam is selected to have elastic properties when cured or set.

Optionally, side wall 34 adjacent structural frame member 16b may include an injection port to direct some of the foam into the hollow space in structural frame member 16b adjacent side wall 34 between its respective side walls 30. Alternately as described above, structural frame member 16b may have a port in its upper wall or side wall to inject the same or a different foam to provide an attachment point for another component, including another structural frame member.

Figure 40:
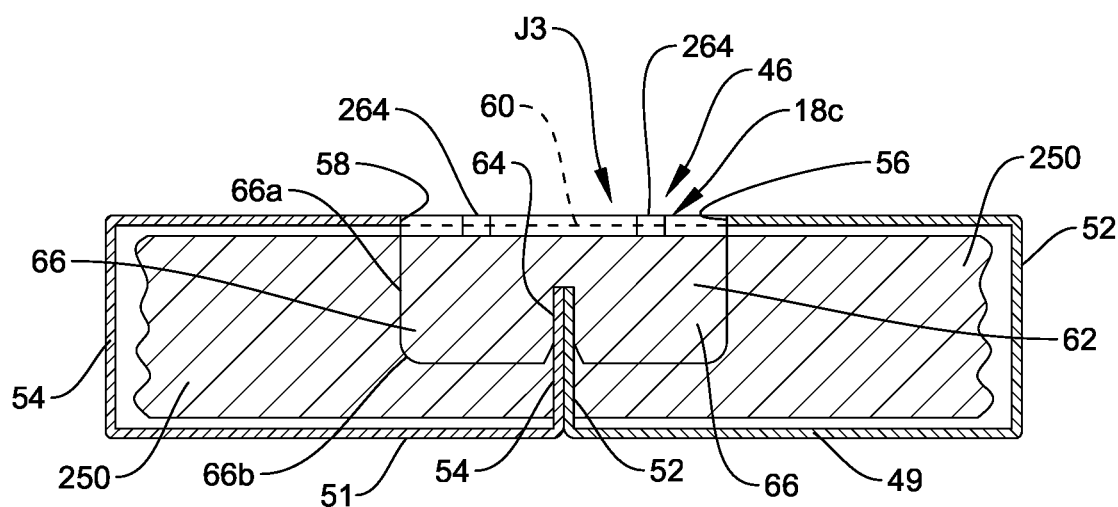
FIG. 40 is a cross-section view similar to FIG. 10A illustrating the joint with an insert.

Referring to FIG. 40, joint J3 may include injection ports 264 in upper wall 60 of structural frame member 46 between its opposed side walls 62 (but which straddle the abutting side walls 52a, 54a) to inject a foam insert 250 into the hollow spaces in structural frame members 17q and 17r. In this manner, the foam can fill the hollow space between side walls 62 and between the distal vertical edges 66a of tabs 66 and opposed side walls 52 and 54. And depending on the height of the tabs 66, the foam may fill and extend between distal bottom edges 66b of tabs 66 and bottom walls 49 and 51 of structural frame members 17q and 17r. Alternately or in addition, injection ports may be provided in upper walls 48 and 50 of structural frame members 17q and 17r.

Figure 41:
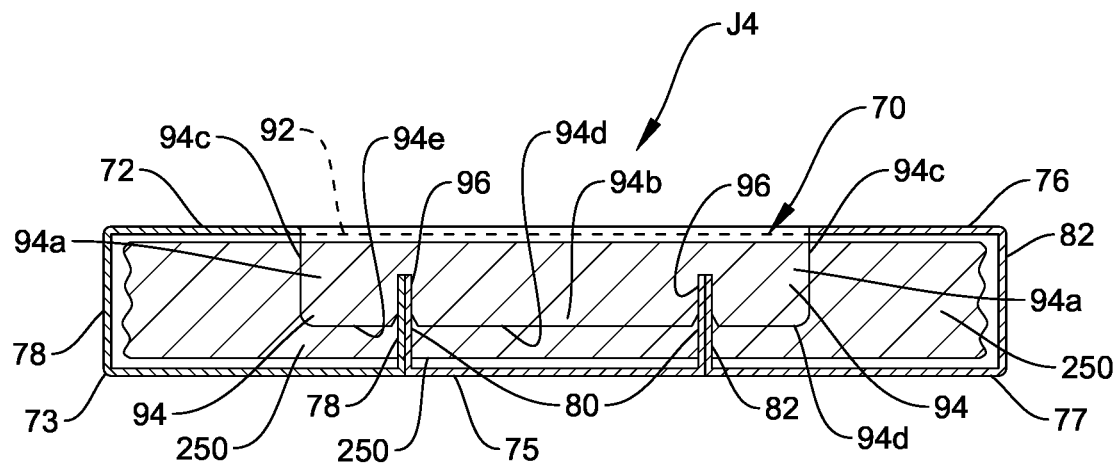
FIG. 41 is a cross-section view similar to FIG. 12A illustrating the joint with an insert.

Referring to FIG. 41, joint J4 may similarly include one or more foam inserts 250, which may be injected through injections ports provided in structural frame member 18a (for example by three injection ports provided in upper wall 70) or in structural frame members 16i, 16i, and 16l (for example by three injection ports in upper walls 72, 74, and 76). In this manner, the foam can fill the hollow space between side walls 94 and between the distal vertical edges 94c of tabs 94a and opposed side walls 78 and 82. And depending on the height of the tabs 94a, 94b, the foam may fill and extend between distal bottom edges 94d, 94e of tabs 94a, 94b and bottom walls 73, 75, and 77 of structural frame members 16i, 16i, and 16l. Alternately or in addition, injection ports may be provided in upper walls 72, 74, and 76 of structural frame members 16i, 16i, and 16l.

Figure 42:
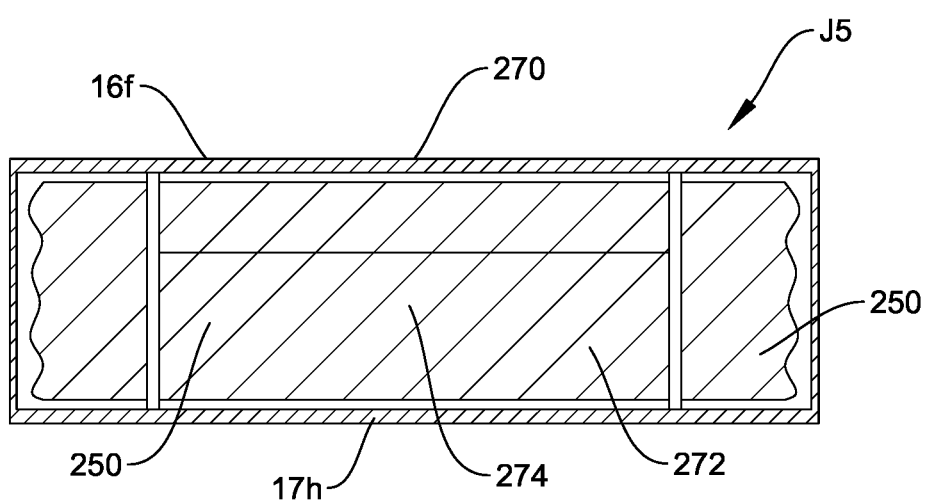
FIG. 42 is a cross-section view similar to FIG. 14A illustrating the joint with an insert.
Figure 43:
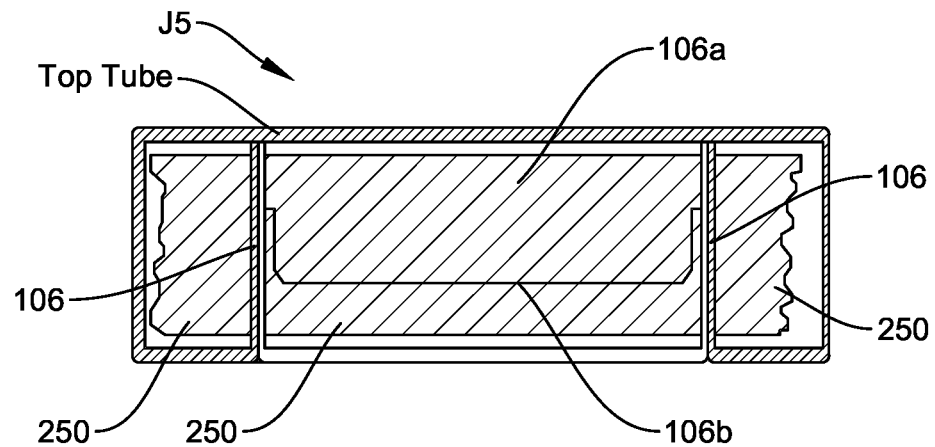
FIG. 43 is a cross-section view similar to FIG. 14B illustrating the joint with an insert.

Referring to FIGS. 42 and 43, joint J5 may similarly include one or more foam inserts 250, which may be injected through an injections port 270 provided in the upper wall or bottom wall of structural frame member 16f or 17h located between their respective side walls and between the opposed ends of notches 102 and 104. Further, to allow the foam to flow into the hollow spaces adjacent their respective abutting side walls, as shown in FIGS. 42 and 43, side wall 272 of structural frame member 17h may include an injection port 274. Further, when tabs 106a are shorter that the side walls of structural frame member 17h, the foam may flow under the tabs 106a into the adjacent hollow space (see FIG. 43).

In this manner, the foam can form a bearing member between the distal bottom free edges 106b of tabs 106a and the bottom wall of structural frame member 17h and between the vertical edges of tabs 106a and the side walls of structural frame member 17h when the slots 106 have more than an air gap to allow foam to flow into the slots adjacent the edges of tabs 106a.

Figure 44:
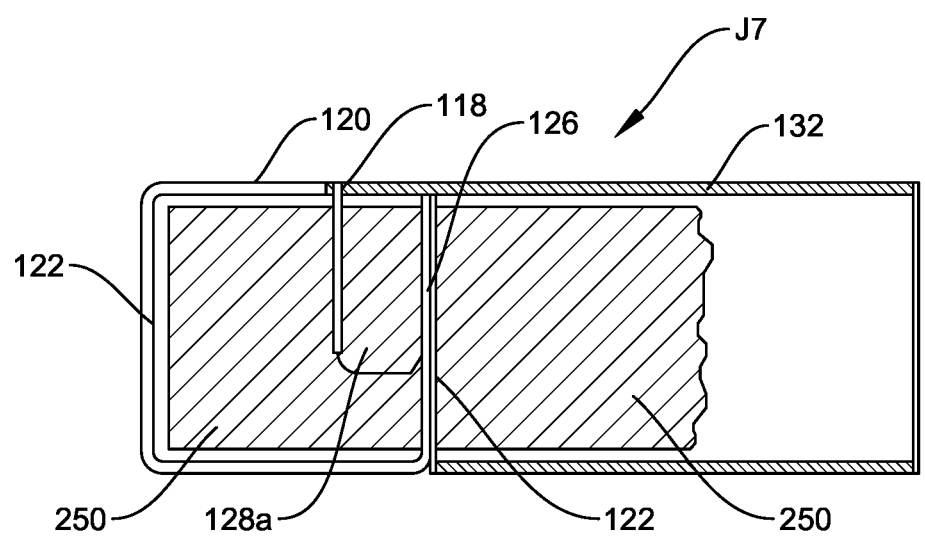
FIG. 44 is a cross-section view similar to FIG. 18A illustrating the joint with an insert.

Referring to FIG. 44, joint J7 may also include a foam insert or inserts similar to joint J1 and J3, with an injection port provided in either upper wall 120 or upper wall 132 of structural frame members 17j or 16o, or side walls 122 or 130.

Figure 45:
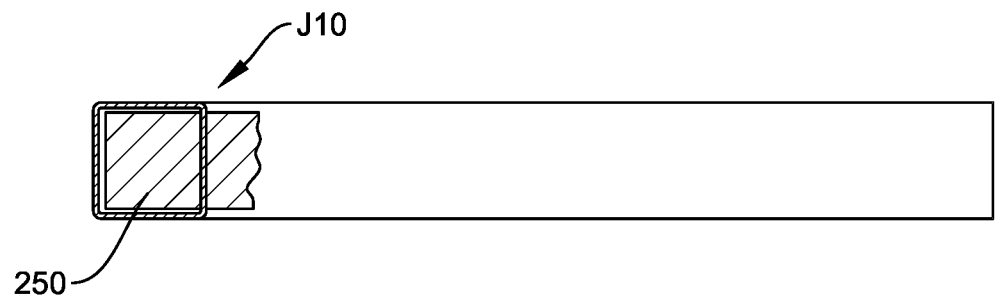
FIG. 45 is a cross-section view similar to FIG. 25 illustrating the joint with an insert.

Referring to FIG. 45, a foam insert 250 may also be used in joint J10, which may be particularly suitable for foam with adhesive properties to enhance the joint one the structural frame member is bent and folded as shown in FIG. 24. Again, one or more injection ports may be provided in the upper, lower and/or side walls 176a, 176b, 178a, 178b of the structural frame member so that the foam forms a bearing member inside the hollow spaces of the two sectioned parts of the structural frame member to resist bending and torsion at the joint to help keep the joint in its folded configuration.

As described above, two different foams may be used to provide different joint characteristics. For example, structural frame members may be connected using two or more joints, including two or more different joints, with one joint being provided with a rigid foam insert and another joint being provided with compressible and, optionally elastic, foam insert.

Figure 46:
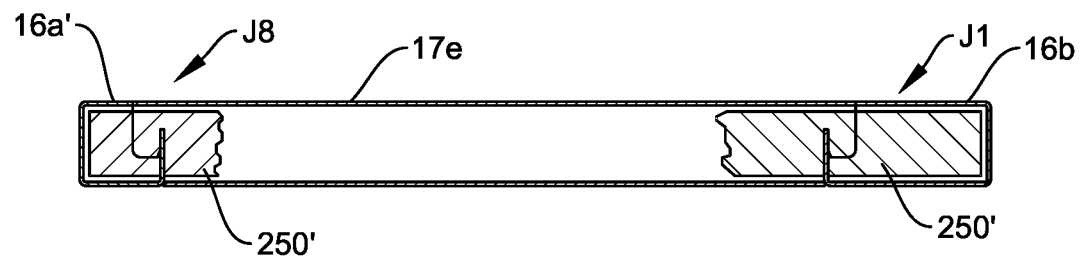
FIG. 46 is a cross-section view similar to FIG. 21C illustrating the joint with an insert.

For example, referring to FIG. 46, three structural frame members are arranged and connected in an H frame configuration with a central structural frame member 17e connected to structural frame member 16b using joint J1 on one end connected to structural frame member 16a using joint J8. Joint 1, for example, may include a foam insert 250 formed from one foam, and joint J8 may include a foam insert 250' formed from a different foam that joint J1. In the illustrated embodiment, joint J1 is provided with a rigid foam insert, while joint J is provided with greater gaps and a flexible, foam insert, and optionally with elastic properties to allow joint J1 to flex under certain loading conditions, such as dynamic loading above a certain threshold.

As noted above, the structural frame members forming the frames described above, may be formed from metal, such as aluminum, or may be formed from a polymer or a composite material. Further, while shown as having rectangular or square hollow closed cross-sections, the shape of the structural frame members may vary and, further, may have solid sections or open sections, and may have a composite section—one part closed and the other part open or solid. The joints may be orthogonal or angled as shown, with angle varying from zero degrees to 90 degrees. Further, as noted, the joints may have a weld or an adhesive on their exterior surfaces. Additionally, the joints may have air gaps or gaps that allow some degree of freedom along or about one or more axes.

It should be understood that in any of the above joints, depending on the forces and vibrations at the joint, welds may be used or omitted. Further, foam inserts may be used to reinforce the joint and/or provided added flexibility when desired. Accordingly, the structural assemblies described herein may provide enhanced connections between the respective structural frame members to varying degrees and, further, provide a greater joining interface or surface to hold the members together, which may provide a greater distribution of load across the joined members. As described above, in some embodiments welding may be used in which case the stresses in the welds may be reduce. In other cases, the welds may be eliminated, which can avoid burn through or gouging that can occur during welding.

I claim:

1. A structural assembly for a recreational vehicle, said structural assembly comprising:
   a first structural frame member having a wall and a hollow space at least partially defined by said wall;
   a second structural frame member having a section thereof extended into said hollow space of said first structural frame member forming an internal interface with said wall of said first structural frame member; and
   a foam material located in said hollow space and filling a portion of said hollow space to thereby form a bearing member adjacent said section to restrict motion of said section relative to said wall and thereby to form an internal connection between said second structural frame member and said first structural frame member at said internal interface to secure said second structural frame member to said first structural frame member to form a recreational vehicle component, wherein said wall of said first structural frame member comprises a pair of side walls, said first structural frame member further having an upper wall and said pair of side walls depending from said upper wall, said upper wall having a notch at a first side wall of said pair of side walls, said second structural frame member having a side wall with a distal end and a slot adjacent said distal end, said section of said second structural frame member being defined between said slot and said distal end of said side wall of said second structural frame member, and said first side wall of said first structural frame member received in said slot of said second structural frame member, and said foam material at least filling said hollow space adjacent said section of said second structural frame member and bearing against said section of said second structural frame member.

2. The structural assembly according to claim 1, wherein said foam material comprises a rigid foam material or a flexible or compressible foam material when cured.

3. The structural assembly according to claim 1, wherein one side wall of said pair of side walls has an injection port in communication with said hollow space for injecting the foam material into said hollow space.

4. The structural assembly according to claim 1, wherein said second structural frame member comprises a tab, said tab formed between said slot and said distal end of said second structural frame member, and said notch of said first structural frame member configured to receive said tab into said hollow space.

5. The structural assembly according to claim 4, wherein said tab comprises a pair of tabs, and said at least one notch to receive said pair of tabs into said hollow space.

6. The structural assembly according to claim 5, wherein said at least one notch comprises a pair of notches to receive said pair of tabs of said second structural frame member into said hollow space.

7. The structural assembly according to claim 4, wherein said tab includes a recess for receiving a portion of said foam material to mechanically couple said foam material to said tab.

8. The structural assembly according to claim 7, wherein said recess comprises a through hole or a notch in said tab.

9. The structural assembly according to claim 1, wherein said second structural frame member has an upper wall, said side wall of said second structural frame member comprising a pair of opposed sides walls depending from said upper wall of said second structural frame member, and a portion of said upper wall of said second structural frame member being located in said notch of said first structural frame member.

10. The structural assembly according to claim 1, wherein said first structural frame member has at least one injection port in communication with said hollow space adjacent said section of said second structural frame member for injecting the foam material into said hollow space adjacent said section of said second structural frame member.

11. The structural assembly according to claim 1, wherein said second structural frame member is a hollow structural frame member with an upper wall and a second hollow space adjacent said first side wall of said first structural frame member, said second structural frame member having an injection port in communication at least with said second hollow space of said second structural frame member adjacent said first side wall of said first structural frame member for injecting the foam material or another foam material into said second hollow space.

12. The structural assembly according to claim 11, wherein another foam material is located in said second hollow space of said second structural frame member.

13. The structural assembly according to claim 1, further comprising a third structural frame member having a side wall with a distal end and a slot adjacent said distal end, said side wall of said third structural frame member defining a second section between said slot and said distal end of said third structural frame member, a second side wall of said pair of side walls of said first structural frame member received in said slot of said third structural frame member wherein said second section of said third structural frame member is extended into said hollow space of said first structural frame member, and said foam material or another foam material forming a bearing member adjacent said second section in said hollow space of said first structural frame member to thereby internally couple said third structural frame member to said first structural frame member.

14. The structural assembly according to claim 13, wherein said foam material adjacent said section of said second structural frame member forms said bearing member adjacent said second section of said third structural frame member.

15. The structural assembly according to claim 13, wherein said third structural frame member is a hollow structural frame member with a third hollow space adjacent a second side wall of said pair of side walls of said first structural frame member, said upper wall of said third structural frame member having an injection port in communication at least with said third hollow space of said third structural frame member adjacent said second side wall of said first structural frame member for injecting said foam material or another foam material into said third hollow space.

16. The structural assembly according to claim 1, wherein said notch extends into said first side wall from said upper wall of said first structural member forming an upper distal edge of said first side wall spaced below said upper wall of said first structural member, and said upper distal edge of said first side wall extending into said slot of said second structural member.

17. The structural assembly according to claim 16, wherein said first side wall of said first structural frame member forms a gap between said first side wall and said second structural frame member in said slot wherein the foam material extends into said gap between said first side wall of said first structural frame member and said second structural frame member.

18. The structural assembly according to claim 16, wherein said slot of said second structural frame member has a terminal end, said upper distal edge of said first side wall of said first structural frame member extending up to said terminal end of said slot of said second structural frame member.

19. The structural assembly according to claim 16, wherein said section of said second structural frame member comprises a tab, said notch of said first structural frame member forming a distal edge of said upper wall spaced inwardly of said first side wall of said first structural frame member, and said distal end of said second structural frame member abutting said distal edge of said upper wall of said first structural frame member in said notch.

20. The structural assembly according to claim 19, wherein said first side wall of said first structural frame member has an inwardly facing surface, said tab of said second structural frame member extending from said distal edge of said upper wall of said first structural frame member orthogonal to said first side wall along said inwardly facing surface of said first side wall of said first structural frame member.

21. The structural assembly according to claim 20, wherein said tab of said second structural frame member forms a gap with said inwardly facing surface of said first side wall of said first structural frame member wherein said foam material extends into said gap between said tab and said inwardly facing surface of said first side wall of said first structural frame member.

22. The structural assembly according to claim 19, wherein said second structural frame member comprises a hollow tubular structural member.

23. The structural assembly according to claim 3, wherein said first structural frame member has a plurality of injection ports for injecting the foam material into said hollow space adjacent said section of said second structural frame member.

* * * * *